United States Patent
Johnson et al.

(10) Patent No.: US 7,287,016 B2
(45) Date of Patent: Oct. 23, 2007

(54) RULE BASED SYSTEM AND METHOD FOR WRITING, DEVELOPING, IMPLEMENTING AND ADMINISTERING LEGISLATION

(75) Inventors: Peter Johnson, Barton (AU); David Mead, Barton (AU)

(73) Assignee: Ruleburst Limited, Braddon Act (AU)

( * ) Notice: Subject to any disclaimer, the term of this patent is extended or adjusted under 35 U.S.C. 154(b) by 379 days.

(21) Appl. No.: 10/709,131

(22) Filed: Apr. 15, 2004

(65) Prior Publication Data
US 2004/0260568 A1 Dec. 23, 2004

Related U.S. Application Data

(63) Continuation-in-part of application No. PCT/AU02/01380, filed on Oct. 3, 2002.

(30) Foreign Application Priority Data

Oct. 16, 2001 (AU) .................... PR8261
Jul. 18, 2002 (AU) .................... 2002950260

(51) Int. Cl.
*G06F 17/00* (2006.01)
*G06N 5/02* (2006.01)

(52) U.S. Cl. ........................................ 706/47
(58) Field of Classification Search ................. 706/47
See application file for complete search history.

(56) References Cited

U.S. PATENT DOCUMENTS 6,298,327 B1 10/2001 Hunter et al.

2002/0107698 A1* 8/2002 Brown et al. ............... 705/1

FOREIGN PATENT DOCUMENTS

WO WO97/41524 A1 11/1997

OTHER PUBLICATIONS

Voermans, W.J.M., "Modelling the draughtman's craft: the LEDA-project Legimatics and legimatica-projects in the Netherlands", Legimatica: informatica per legiferare, 109-132 (1995).*
Timothy Arnold-Moore, "Automatic generation of amendment legislation",Proceedings of the 6th international conference on Artificial intelligence and law, pp. 56-62, 1997.*

(Continued)

*Primary Examiner*—Anthony Knight
*Assistant Examiner*—Michael B. Holmes
(74) *Attorney, Agent, or Firm*—Choate, Hall & Stewart, LLP

(57) ABSTRACT

A rule based computerized method of developing, implementing and administering legislation is disclosed which includes developing a computerized database containing a set of declarative rules in accordance with which the legislation can be developed, written in and delivered; utilizing the computerized database to develop the policy for the legislation in accordance with the set of rules, and/or utilizing the computerized database to write the legislation in accordance with the set of rules, and/or utilizing the computerized database to design the service to administer the legislation in accordance with the set of rules, and/or utilizing the computerized database to administer and/or evaluate the legislation in accordance with the set of rules; wherein the policy development, writing of legislation, service design, administration and/or evaluation are functionally integrated by the computerized database.

13 Claims, 6 Drawing Sheets

OTHER PUBLICATIONS

M. Logghe, K. van de Kerchove, Marie-Francine Moens, "Automatic Version Management of Legislation: The Agora-Lex Project", DEXA Database and Expert Systems Applications Workshop, pp. 1051-1055, 2000*

Timothy Arnold-Moore, "Automatically processing amendments to legislation", Proceedings of the 5th international conference on Artificial intelligence and law, pp. 297-306, 1995.*

Greenleaf et al. "More than wyshful thinking: AustLII's legal inferencing via the World Wide Web", Proc. 6th International Conference on Artificial Intelligence and Law (Melbourne 1997), pp. 47-55.*

Bench-Capon, et al. An Experiment in Discovering Association Rules in the Legal Domain. IEEE Proceedings of 11th International Workshop on Database & Expert Systems Applications. Sep. 6-8, 2000. p. 1056.

Johnson, Peter. Electronic Service Delivery: Achieving Accuracy and Consistency in Complex Transactions. National Conference of the Institute of Public Administration. Australia. Nov. 1998.

Vanthienen, J., et al. Restructuring and Simplifying Rule Bases. IEEE Proceedings of 7th International Conference on Tools with Artificial Intelligence. Nov. 1995.

International Search Report for PCT/AU02/01380 mailed Nov. 14, 2002 (1 page).

* cited by examiner

Fundraising

Fundraising and Securities Details

* p474. What will be the type of offer? — sale / issue

* p475. What will be the type of securities? — shares / debentures / interests in a registered MIS / rights or interests in the above / options to acquire any of the above

* 315. Will the securities offered be securities in Kin Kin Holdings No4 Pty Ltd? ○ Yes  ○ No

[Back] [Next] [Skip]

---

Type of securities

Type of securities
  Shares
  Debentures
Further information

Type of securities

The type of securities will affect whether particular exemptions to the disclosure requirements can apply.

Shares

Shares are equity securities. A share confers certain rights upon the holder: it is a security issued by a company, representing part ownership in that company, which entitles the holder to participate in the distribution of the company's profits and, when the company is wound up, its surplus assets.

Debentures

Debentures are a type of loan or debt

[Commentary] [Butterworths Online] [Help]

Corporations Expert - Fundraising v1.0

Whether offer is regulated by Ch 6D

Outcome of Procedure

Disclosure will not be required under Chapter 6D of the Corporations Law.

Document Generation

Click here to generate a summary report of the Fundraising Procedure exit  save  history  notes

FIG 8

RULE BASED SYSTEM AND METHOD FOR WRITING, DEVELOPING, IMPLEMENTING AND ADMINISTERING LEGISLATION

TECHNICAL FIELD

This invention relates to rule based systems and methods.

The invention has particular but not exclusive application to rule based systems and methods of developing, implementing and administering legislation, and particularly to writing legislation.

As used herein the expression "rule based" is to be given a broad meaning. Rule based systems and methods are ones which are developed and implemented, and which operate, in accordance with a set of rules. The rules are preferably declarative, i.e. they explain rather than pronounce.

BACKGROUND OF THE INVENTION

It is of course known for systems and methods to be developed in accordance with a set of rules. It is also known for existing legislation to be analyzed using computerized databases built on a set of rules.

BRIEF SUMMARY OF THE INVENTION

The present invention aims to provide an alternative to known rule based systems and methods for developing, implementing and administering legislation.

This invention in one aspect resides broadly in a rule based computerized method of developing, implementing and administering legislation, the method including:— developing a computerized database containing a set of declarative rules in accordance with which the legislation can be developed, written in and delivered;

utilizing the computerized database to develop the policy for the legislation in accordance with the set of rules;

utilizing the computerized database to write the legislation in accordance with the set of rules;

utilizing the computerized database to design the service to administer the legislation in accordance with the set of rules, and utilizing the computerized database to administer and/or evaluate the legislation in accordance with the set of rules;

wherein the policy development, writing of legislation, service design, administration and/or evaluation are functionally integrated by the computerized database;

wherein the rules are such as can be expressed in the general format "IF [premise], THEN [conclusion]";

wherein the policy development includes at least one of the following functions: policy analysis, development of policy options, public consultation, testing and refining policy;

wherein the writing of legislation includes at least one of the following functions: drafting legislation, testing and refining draft legislation, enactment of legislation;

wherein the service design includes at least one of the following functions: testing impact of final legislation, translation of legislation into operational policy, data requirements analysis, design of service delivery structures and systems, public education;

wherein the administration includes at least one of the following functions: public education, staff training, delivery of services, and wherein the evaluation includes at least one of the following functions: design of policy impact measurement, measurement of policy impact.

As used herein the expression "functionally integrated" is to be given a broad meaning and includes interaction and interdependency of the respective functions in the sense that development or implementation of any one function takes into account developments and implementations in other functions.

As used herein the expression "computer database" is to be given a broad meaning and is not limited to the narrow meaning of a database per se. Rather the expression is to be seen as encompassing a computerized application which is developed to implement a computer-based system or methodology and which may include a database per se.

It is preferred that the rules are written in a spoken language, the method further including converting the rules when written in the spoken language into a stylized or symbolic format or representation.

Preferably the rules are written in a format or representation corresponding to acceptable legislation whereby the legislation is written in a format or representation corresponding to the set of declarative rules.

The format or representation preferably includes:— an alternative conclusion for reflecting the closed nature of legislative rules, and/or a source reference for referencing items in the database to legislative provisions, and/or a configuration syntax whereby the rules are written in the form of the legislative provisions.

In another aspect this invention resides broadly in a rule based computerized method of writing legislation, the method including:— developing a computerized database containing a set of declarative rules expressed in the general format "IF [premise], THEN [conclusion]" in accordance with which the legislation can be written, and utilizing the computerized database to write the legislation in accordance with the set of rules;

wherein the rules are written in a format or representation corresponding to acceptable legislation whereby the legislation is written in a format or representation corresponding to the set of declarative rules, and wherein the writing of legislation includes at least one of the following functions: drafting legislation, testing and refining draft legislation, enactment of legislation.

In another aspect this invention resides broadly in a rule based computerized method of writing legislation, wherein a computerized database is developed containing a set of declarative rules in accordance with which the legislation can be written, the rules being written in a format or representation corresponding to acceptable legislation whereby the legislation is written in a format or representation corresponding to the set of declarative rules, the computerized database being utilized to write the legislation in accordance with the set of rules; the method including:— developing a plurality of agreed legislative drafting conventions which constrain the drafting of legislation in accordance with a logical structure, and designing a computer model incorporating the agreed legislative drafting conventions.

The invention may also be seen as residing in a rule based computerized method of writing legislation, the method including:— developing a computerized database containing a set of declarative rules in accordance with which the legislation can be written, and utilizing the computerized database to write the legislation in accordance with the set of rules;

wherein the rules are written in a format or representation corresponding to acceptable legislation whereby the legislation is written in a format or representation corresponding to the set of declarative rules;

wherein a plurality of agreed legislative drafting conventions constrain the drafting of legislation in accordance with a logical structure, and wherein the agreed legislative drafting conventions are incorporated in a computer model.

In one embodiment, the computer model is preferably an XML schema.

The method may also include providing enhancements to the task of editing when drafting legislation whereby the use of the legislative drafting conventions is facilitated.

The method may also include creating a legislative parser to convert the text of the legislation to a form that can be checked against the computer model and to report any failures to the drafter of the legislation.

The method may also include creating facilities to import the parsed legislation into a pre-existing legislative rulebase technology, and to generate a rulebase.

The method may also include creating a testing methodology whereby the drafter of the legislation can specify and test an appropriate range of cases against the legislation.

In another aspect this invention resides broadly in a rule based computerized system for developing, implementing and administering legislation, the system including:— a computerized database containing a set of declarative rules in accordance with which the legislation can be developed, written and delivered, and program means for executing the set of rules to develop the policy for the legislation and/or to write the legislation and/or to administer the legislation and/or to administer the legislation and/or evaluate the legislation;

wherein the policy development, writing of legislation, service design, administration and/or evaluation are functionally integrated by the computerized database.

In a further aspect this invention resides broadly in a rule based computerized system for writing legislation, the system including:— a computerized database containing a set of declarative rules in accordance with which the legislation can be written, and program means for executing the set of rules to write the legislation;

wherein the rules are written in a format or representation corresponding to acceptable legislation whereby the legislation is written in a format or representation corresponding to the set of declarative rules.

It is preferred that a plurality of agreed legislative drafting conventions constrain the drafting of legislation in accordance with a logical structure, and that the program means utilizes a computer model incorporating the agreed legislative drafting conventions.

In one embodiment, the computer model is preferably an XML schema.

In another aspect this invention also resides broadly in a computer program embodied on a machine readable medium that provides a system and method as defined above for developing, implementing and administering legislation.

In another aspect this invention also resides broadly in a computer program embodied on a machine readable medium that provides a system for or operates a method of writing legislation as defined above, For convenience, the expression "rulebase" will sometimes be used in the following description to refer to a computerized database containing a set of declarative rules.

BRIEF DESCRIPTION OF THE DRAWINGS

In order that this invention may be more easily understood and put into practical effect, reference will now be made to the accompanying drawings which illustrate a preferred embodiment of the invention, wherein:—

FIGS. 3-10 are screen dumps illustrating various aspects of the system of FIGS. 1, 2 and 11 applied to provisions of the Australian Corporations Act 2001.

DETAILED DESCRIPTION OF THE INVENTION

Figure 1:
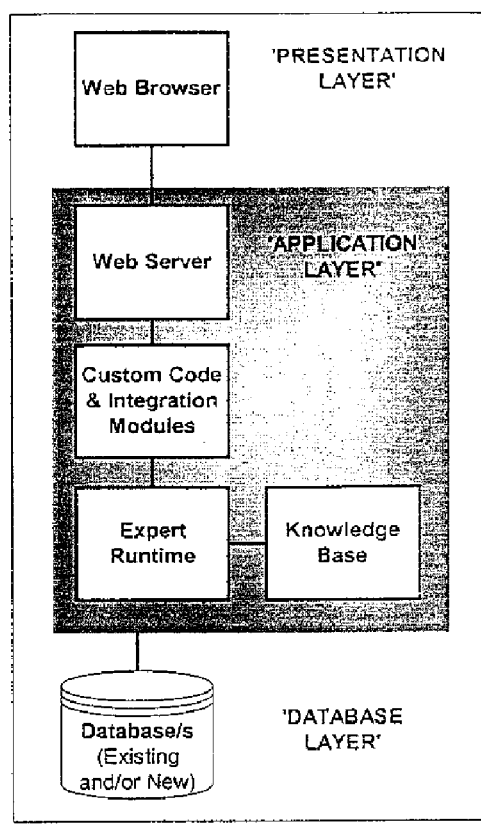
FIGS. 1, 2 and 11 are schematic block diagrams illustrating a known system called STATUTE Expert developed by the present applicant for modeling extant legislation and rules and building them into a rulebase.

Before various aspects of the present invention are described in detail, an outline of a rulebase developed by the applicant will be provided.

The applicant's known rulebase system STATUTE Expert is a tool for constructing software solutions bearing on the administration of extant legislation and is now described in broad detail with reference to FIGS. 1-11.

STATUTE Expert supports varying agency requirements having common business concerns that STATUTE Expert addresses by:

Supporting specialist decision-making by non-specialists.

Supporting integration to existing applications.

Adhering to industry standards.

Addressing holistically the major issues confronting organizations in the uptake of new technology.

STATUTE Expert is a tool for constructing software solutions designed explicitly to cope with legislation and dealing with administrative domains where there are constant changes to case law and legislation. STATUTE Expert Can be used for discrete determinations within existing infrastructure, is able to be customized easily to meet varying and changing requirements, and addresses issues of security, scalability and integration. STATUTE Expert reduces the risk of cost overruns and increases the opportunities to realize business benefits. It does this by:

Using plain English to model legislation and policy, thereby obviating the need for writing code.

Allowing for effective verification of rules by non-technical staff without the need for interpretation.

Incorporating the administrative processes necessary to implement legislation.

Allowing a rapid development cycle—i.e. it can be up and running quickly, which has obvious business benefits.

Encouraging vigorous client interaction during development, which delivers a solution that recognizes and meets the needs of users and the client organization.

STATUTE Expert provides a framework that facilitates rapid delivery of technical solutions with flow-on effects to service models, service delivery and business outcomes. The major elements are:

The Expert Runtime environment—the operational core of an Expert system.

Expert Developer—used for creating and maintaining the Knowledge Base, which is where human knowledge and expertise is captured.

Methodologies for rulebase analysis, development, verification and testing.

STATUTE Expert Runtime is the operational toolkit used in conjunction with a specific Knowledge Base to provide the core of an Expert Application. This core is augmented by client specific code to create an integrated application.

The toolkit comprises the following capabilities:
Generation of user interfaces;
Linking to databases and database manipulation;
Decision making and inferencing;
Report generation;
Audit capabilities; and
Customization readiness.

Statute Expert has progressed from a DOS based system via Windows 3.0 and a Client Server iteration through to the current Internet oriented system and effectively fits with a range of technologies in that:

It has been designed with Intranet and Internet technologies in mind.

It supports the Windows platform.

It uses XML to exchange data in a neutral and open format that allows it to work effectively with a wide variety of applications and systems.

It uses a Best of Breed/layered approach that ensures that it is able to provide multiple degrees of support and customization.

Any programming language that works with COM objects can be used to integrate with Expert. These include Delphi, C++ and Visual Basic.

It is designed to run under web servers—IIS (Internet Information Server).

It can operate under MTS (Microsoft Transaction Server).

The end-user experience is delivered through Expert Applications which are typically structured into three layers, each providing a specific function. This basic architecture is a standard 3-tier configuration comprising:

The Client or Presentation layer: This is typically HTML accessed via a browser.

The Application layer: This is the layer at which legislative and business rule processing takes place via Expert Runtime and, if required, special purpose application code and integration modules also reside in this layer.

The Database layer: Connection to most databases requires only a straightforward integration effort. There is no restriction imposed by Expert on the platform on which the database can operate. Additionally Expert provides a standard module that, via ODBC, is able to access a wide range of databases.

An Expert Application in production is illustrated in FIG. 1 and reflects normal industry practice.

STATUTE Expert has the flexibility to be customized to meet specific requirements reflecting expected organizational "look and feel" and standards, and specific requirements in terms of data entry controls and mechanisms.

The use of HTML for the Presentation layer facilitates the complete customization of the User Interface. Changes may involve simply moving text or changing font, complete changes using Cascading Style Sheets for consistency across a Web site and Modification of images. All of these changes can be effected without difficulty.

STATUTE Expert has been designed with Intranet and Internet technologies in mind, but the technology can operate effectively apart from these. Cases where the Intranet/Internet model would not be used include where a user interface is not required (this is effected by employing the data transfer and decision-making facilities only, and is used when an organization uses STATUTE Expert to make specialist determinations within an existing process); where there are specific User Interface needs—e.g. voice response, native Windows, and where there are specific non-Intranet/Internet platform requirements Data Integration The capacity to transfer data is essential when melding new technology with existing infrastructure. Expert Applications are able to integrate effectively with most existing systems. Expert Runtime interfaces readily to existing or legacy systems and data is able to move between the existing system and the Expert Application.

Determinations made by Expert can be passed to existing systems, updating them as conclusions are reached. It supports the extraction of pre-existing data from other systems and its insertion into the Expert Application. This ensures that data can be stored in one central repository rather than being spread throughout multiple, independent systems.

XML is the data transfer format used by Expert Runtime. This is a neutral and safe format for passing data and is used increasingly within the industry for this purpose. Using XML ensures that integration with an Expert Application is relatively simple.

Expert Applications piggy-back effectively on existing corporate data access mechanisms and make use of XML to complete integration activities. Consequently, data integration is constrained only by an organization's existing capabilities.

Security

The servers run on Microsoft Windows NT, which is recognized as a secure operating system. Additionally, HTTPS, secure Internet protocols that encrypt data traffic, can be employed to ensure that data traffic between the system client and servers is protected.

Internal measures employed by an organization to protect the privacy of data in its systems, (e.g. encryption and shared logons) can also be customized to deal effectively with data security. This can be effected simply by piggybacking on existing security measures or infrastructure.

An Expert Application can be developed to support differing delegations. For example, at different levels of delegation, a user can exercise discretion to override a determination reached by the system. Delegations are determined by the client organization and implemented by the use of identifiers (such as secure logons) in the Expert Application.

Audit Capability

STATUTE Expert provides the means for detailed and accurate auditing of decisions. It produces fully reasoned determinations supported by reports. It has the capacity to reconstruct data at any given point during a process, and report on changes made or delegations exercised during a process. These capabilities enhance an organization's capacity to be accountable by offering auditability and transparency in decision-making and in process management.

Scalability

Upgrading the server is the first option for increasing scalability. As with all systems, increases in RAM and processing speed will increase capacity. STATUTE Expert supports scalability by allowing its deployment in a load-balanced environment (e.g. Microsoft Windows Load Balancing Services). This allows Expert to harness the processing capacity of many machines while operating as a cohesive unit from the user perspective. Users access the server cluster using a single URL address and the system is then able to route a given user to a machine in the server cluster. This ensures that the load is shared effectively across the machines within the cluster.

Figure 2:
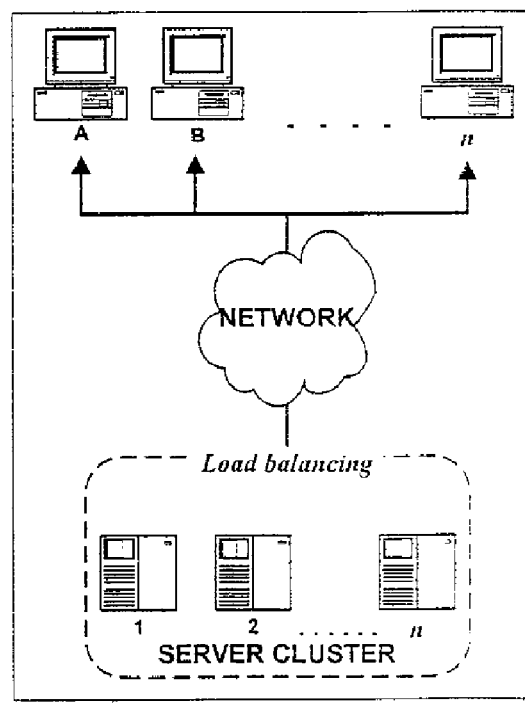

As seen in FIG. 2, in a load balancing situation, growth in user numbers is accommodated simply by adding further servers to the cluster. The load balancing system allows this to be done seamlessly and safely without the requirement to write additional code and without disrupting normal user access. STATUTE Expert can support server clusters with or without server affinity. Where a server cluster is operated without server affinity, Expert provides functions for retrieving and restoring session state, supporting organizations wishing to implement seamless failover (i.e. the ability to operate after a server failure, without any apparent disruption).

The Development Environment

Expert Developer is the development environment used to create and maintain an Expert Application's Knowledge Base and has the following features of Expert Developer provide for an effective, targeted, and modern development environment:

It is a collaborative multiple user development environment.

The Knowledge Base is stored in a SQL server database, providing industrial strength capabilities.

The client runs inside Microsoft Internet Explorer and is a web application.

Support is provided to direct the user towards the best means of employing these tools is provided by a detailed methodology framework that provides a basis for the conception, development and maintenance of applications. Additionally, Expert Developer is supported by a specialized methodology for testing rulebases.

The application of STATUTE Expert to legislation will now be explained by reference to the Australian Corporations Act 2001, Section 707 of which contains the following provisions:—

CORPORATIONS ACT 2001
-SECT 707
Sale Offers that Need Disclosure
Only Some Sales Need Disclosure
(1) An offer of securities for sale needs disclosure to investors under this Part only if disclosure is required by subsection (2), (3) or (5).
Off-Market Sale by Controller
(2) An offer of a body's securities for sale needs disclosure to investors under this Part if:
(a) the person making the offer controls the body; and
(b) either:
(i) the securities are not quoted; or
(ii) although the securities are quoted, they are not offered for sale in the ordinary course of trading on a stock market of a securities exchange; and section 708 does not say otherwise.
Note: See section 50AA for when a person controls a body.
Sale Amounting to Indirect Issue
(3) An offer of a body's securities for sale within 12 months after their issue needs disclosure to investors under this Part if the body issued the securities:
(a) without disclosure to investors under this Part; and
(b) with the purpose of the person to whom they were issued:
(i) selling or transferring them; or
(ii) granting, issuing or transferring interests in, or options or warrants over, them; and section 708 does not say otherwise.
Note 1: Section 706 normally requires disclosure for the issue of securities. This subsection is intended to prevent avoidance of section 706. However, to establish a contravention of this subsection, the only purpose that needs to be shown is that referred to in paragraph (b). Note 2: The issuer and the seller must both consent to the disclosure document (see section 720).

Evidence of Intention—Indirect Issue
(4) Unless the contrary is proved, a body is taken to issue securities with the purpose referred to in paragraph (3)(b) if any of the securities are subsequently sold, or offered for sale, within 12 months after their issue.
Sale Amounting to Indirect Off-Market Sale by Controller
(5) An offer of a body's securities for sale within 12 months after their sale by a person who controlled the body at the time of the sale needs disclosure to investors under this Part if:
(a) at the time of the sale by the controller either:
(i) the securities were not quoted; or
(ii) although the securities were quoted, they were not offered for sale in the ordinary course of trading on a stock market of a securities exchange; and
(b) the controller sold the securities without disclosure to investors under this Part; and
(c) the controller sold the securities with the purpose of the person to whom they were sold:
(i) selling or transferring them; or
(ii) granting, issuing or transferring interests in, or options or warrants over, them; and section 708 does not say otherwise.
Note 1: Subsection (2) normally requires disclosure for a sale by a controller. This subsection is intended to prevent avoidance of subsection (2). However, to establish a contravention of this subsection, the only purpose that needs to be shown is that referred to in paragraph (c).
Note 2: See section 50AA for when a person controls a body.
Note 3: The controller and the seller must both consent to the disclosure document (see section 720).

To creating an Application by STATUTE Expert, a legal analyst analyses a piece of legislation (or other well defined set of business rules) using the STATUTE expect knowledge base design methodology. The legislation above is a small extract from the legislation that is modeled in the demonstration application that follows.

Figure 3:
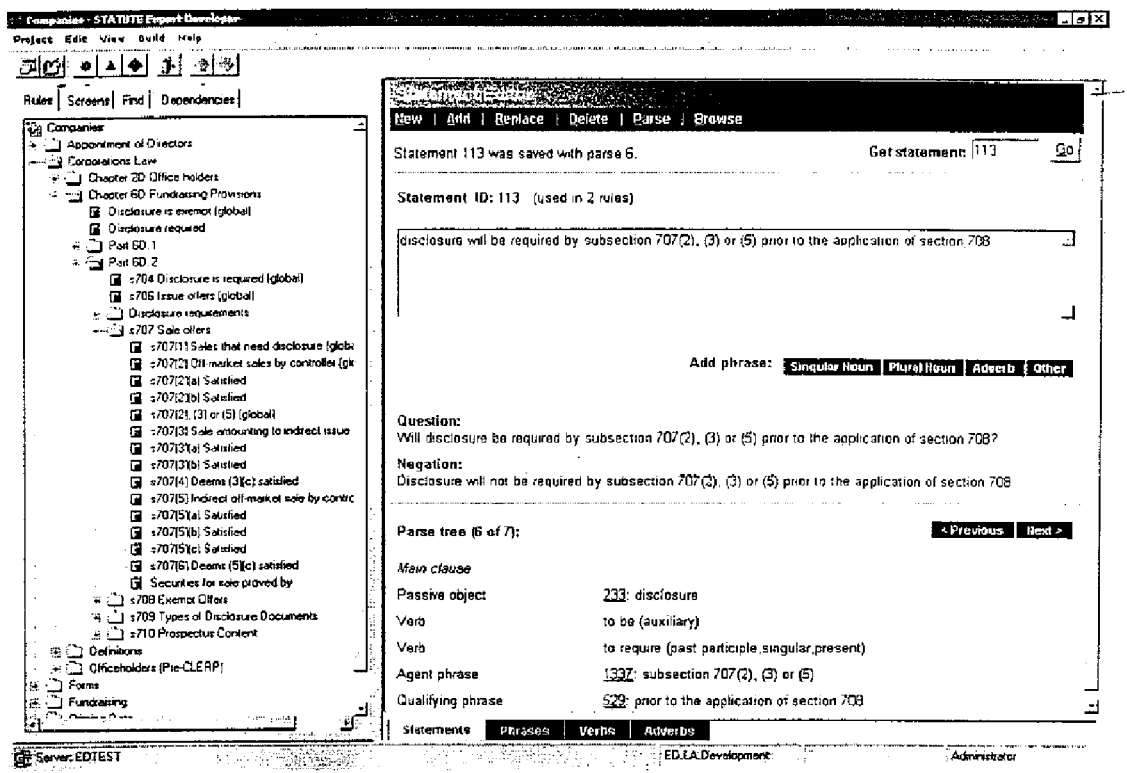

As seen in FIG. 3, an English language rulebase and a user interface are then created using STATUTE Expert Developer which provides a richly featured development environment that allows teams of legal and business analysts to efficiently collaborate to develop huge English language rulebases.

Figure 4:
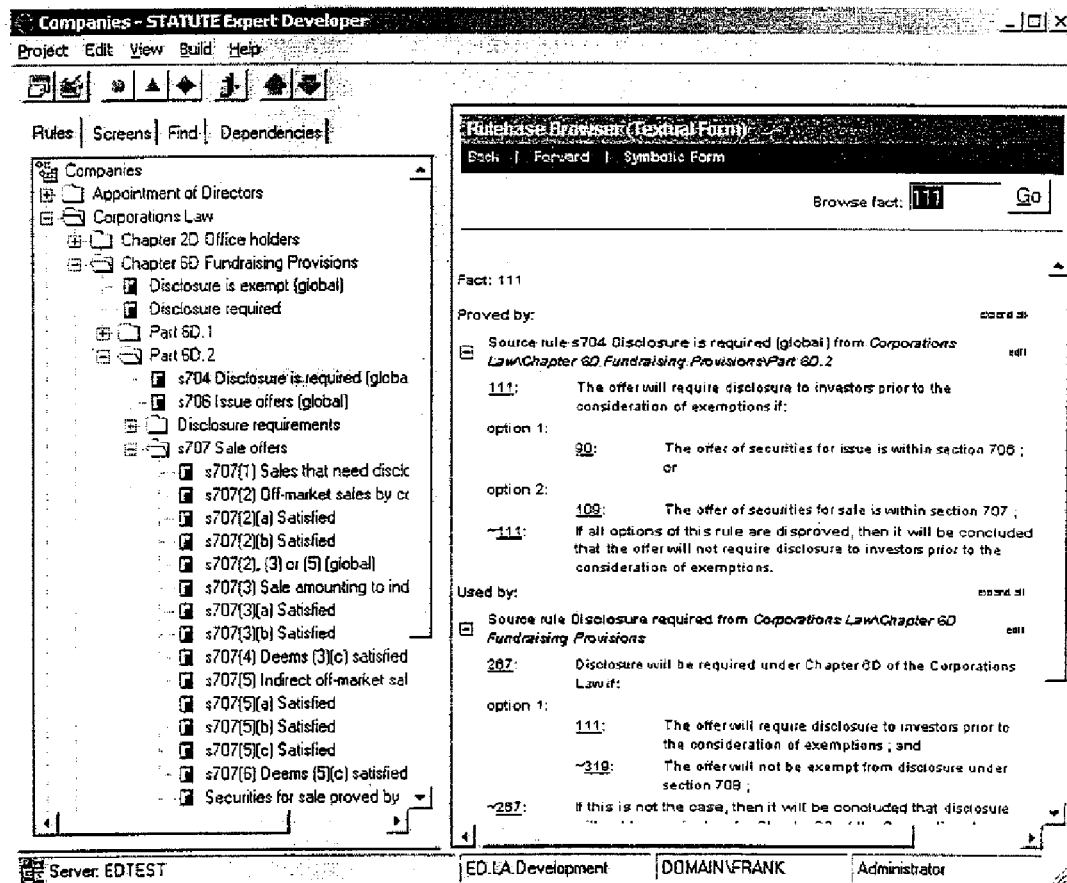

As seen in FIG. 4, once the rules have been entered they can be verified by a domain expert who compares the English language rules with the source material. STATUTE Expert also includes tools for automatic checking and regression testing of the rulebase.

Figures 5, 6:
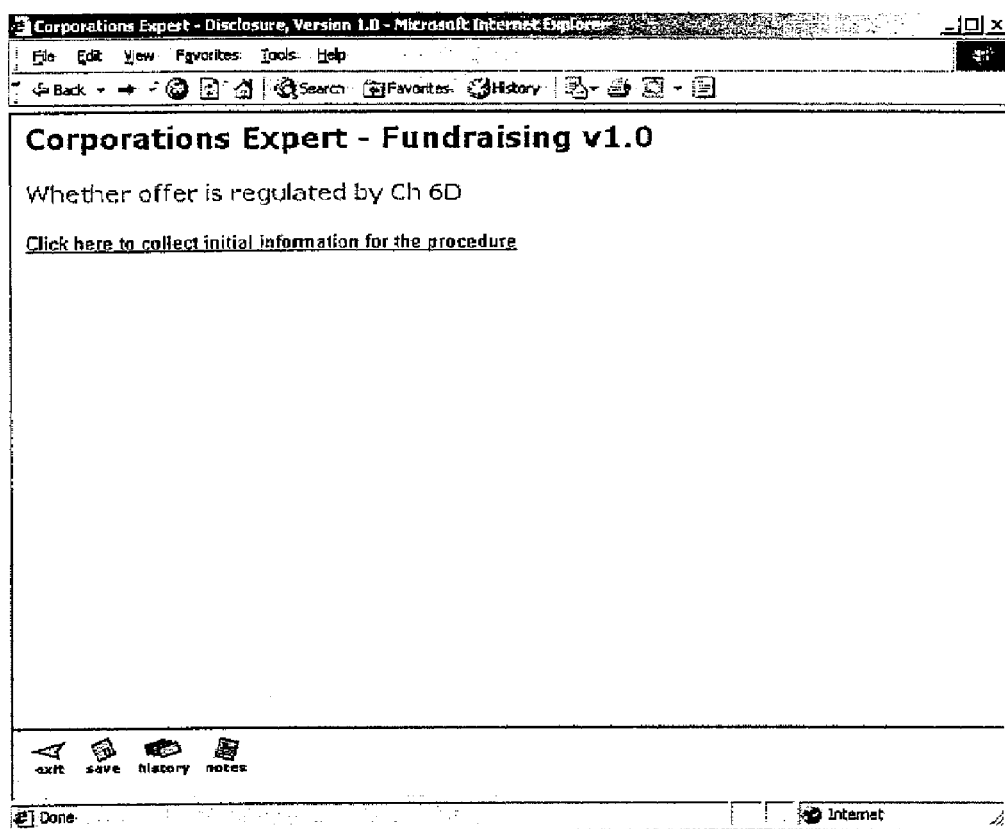

FIG. 5-10 illustrate the application of STATUTE Expert to a Fundraising Application, FIG. 5 illustrates the screen constituting the start page for an application created to allow companies to determine whether a fundraising offer is regulated by Chapter 6D of the Corporations Law. It allows company administrators to accurately determine their company's compliance with the Corporations Law by completing a guided interview process.

The user is presented with a series of screens containing simple questions as illustrated in FIG. 6, the system removing from the process any screens that are irrelevant given answers already collected. This can mean that, for example, that the user only sees 10 screens in an application that has 50 or 100 total screens. As seen in FIG. 7, STATUTE Expert uses the information that it has collected to personalize the questions it asks, making them easier to understand and relate to the situation being investigated. Each screen contains customized reference information to help the user answer the questions that are being asked.

Once STATUTE Expert has enough facts to make a decision, the user is returned to the home page and the outcome of the investigation is displayed in the manner seen in FIG. 8. The user can be confident in knowing that this is the correct outcome given the answers they provided, the system having automatically applied all the relevant rules to reach its decision.

Figures 9, 10:
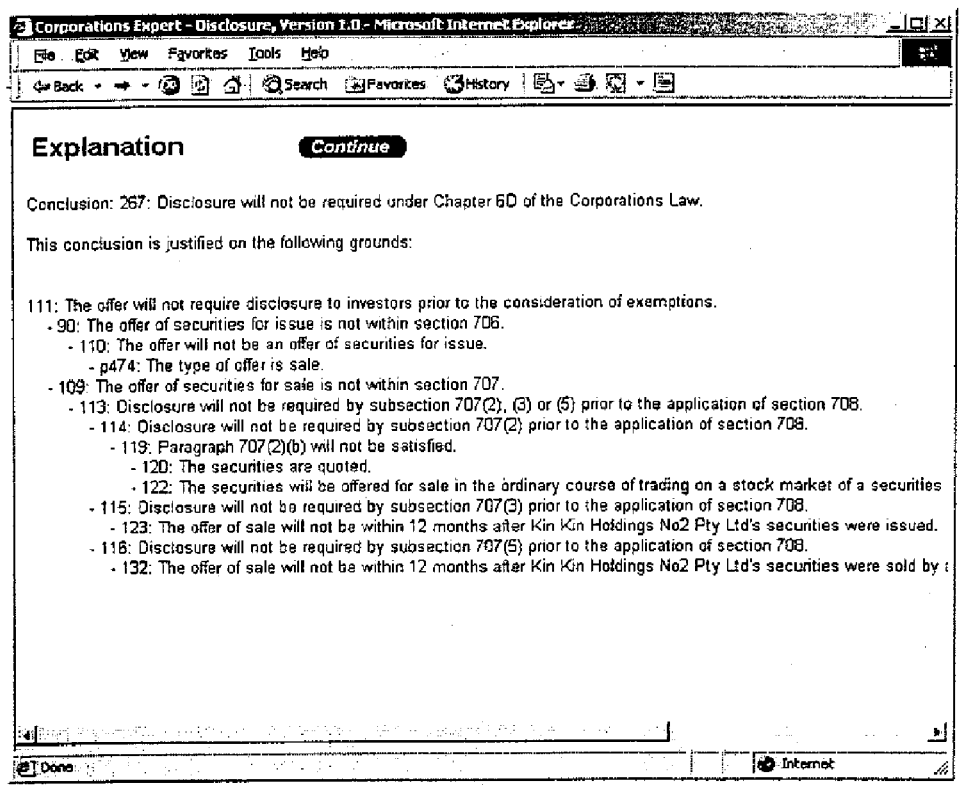

How Report. Moreover, as seen in FIG. 9, a "How Report" is available so that the user can see exactly how STATUTE Expert reached its decision. Once the investigation is saved, this report will always be available should the decision ever need to be reviewed or audited.

The system can generate customized letters or claim forms that contain the information generated by the investigation. As seen in FIG. 10, the system language engine is used to that statements of fact are personalized and written in normal English.

Figure 11:
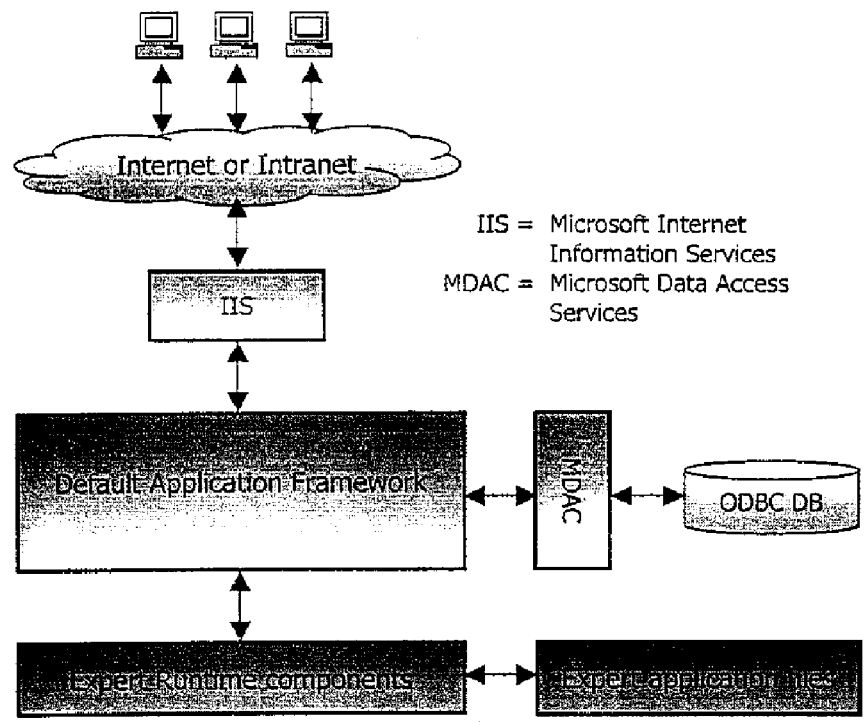

In practice, as seen in FIG. 11, the STATUTE Expert system is based on standard technologies and can be integrated into any corporate IT environment. It can be used as a stand-alone application, integrated with an existing data store or used as a component of a wider corporate application. It can support deployments from tens to tens of thousands of users.

Turning now in more detail to the present invention, it will be appreciated that within government agencies responsible for administering legislation, there tend to be several common aspirations for quality improvement.

These aspirations may reflect existing problems, or simply a desire to do things better. They can be summarised as a desire for:

better policy formulation and advice;

better legislation, that gives precise and accurate effect to policy objectives, ideally in a way that is coherent to the staff and constituents of the agency;

reduced implementation time for new policy or new legislation;

increased accuracy and consistency in the administration of legislation;

an enhanced array of options for delivering the agency's services, whether to improve services to clients or to reduce costs;

a greater focus on clients' needs in their interactions with the agency (rather than on agency processes, structures and convenience) in all of the work of the agency;

tighter integration of policy and service delivery functions, so as to help to achieve some of these objectives.

All of these objectives focus on the heart of an agency's business: its policy and legislation. These give the agency its character and shape. This core knowledge informs almost every aspect of the agency's work.

Policy and legislation are the immediate subject-matter of policy development and legislative drafting. But they are also central to service delivery: in most government agencies, the services that clients seek are determinations or advice on the application of legislation to their circumstances. It is the legislation that defines clients' rights, entitlements and obligations.

The present invention provides a way of addressing all of these objectives within an integrated model and which does not see these objectives as separate, unconnected activities, each relating to a discrete part of an agency's business. The invention facilitates focusing on the last objective—tighter integration of policy and service delivery functions—because it has become apparent that these functions and all of the listed objectives are critically interrelated.

There are four key functions in the overall life cycle of legislation:

the development of policy;

the drafting and enactment of legislation;

the design of service delivery structures and methods to administer the legislation;

the delivery of services based on the legislation.

The present invention in one aspect develops an integrated model for these functions and describes the model not simply in terms of those four key activities, but in a more refined set of sub-activities.

The elements of this model can be seen as forming a circle of activities, with successive cycles of policy development→legislation→implementation→evaluation. Key steps in this cycle are illustrated in FIG. 12 which also emphasises the primacy of the legislation and policy rules in this cycle of activity.

Figure 12:
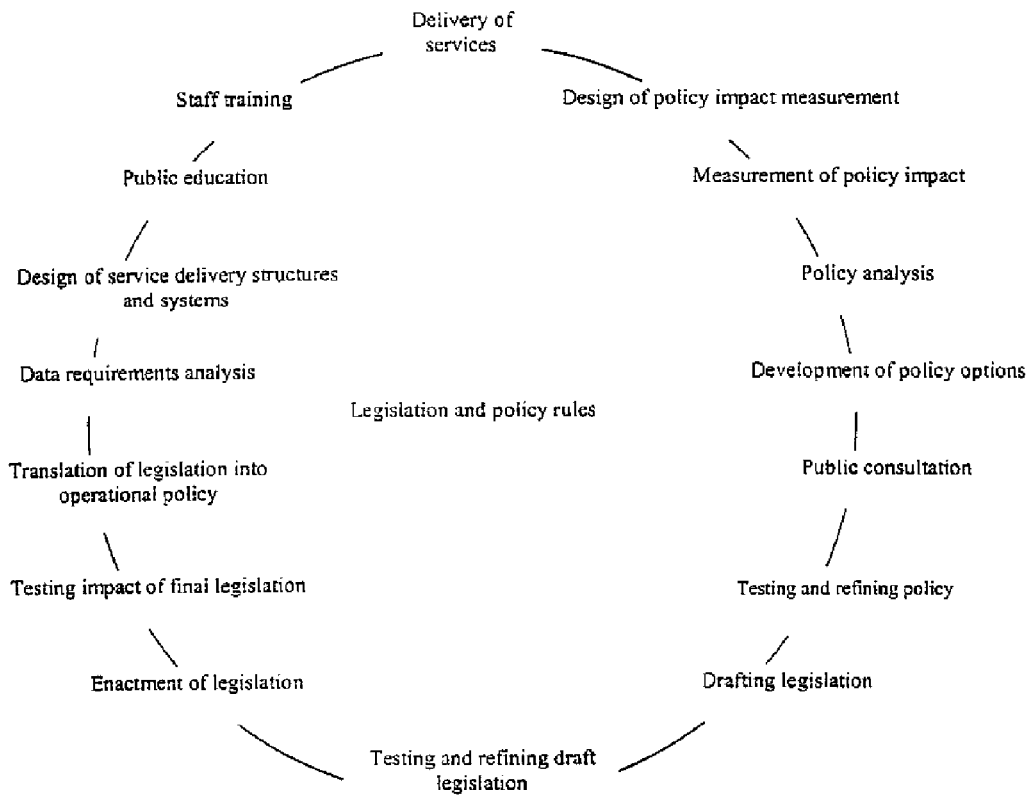
FIG. 12 illustrates an integrated model in accordance with the present invention showing the various functions occurring within the overall life cycle of legislation.

FIG. 12 emphasises that these activities are interrelated. In practice, many of the activities frequently take place out of sequence. The interactions between different functions are more varied and complex than the simple cycle suggests. However, the fact that activities take place out of sequence doesn't detract from the proposed approach. Rather, the interreliance of the elements highlights the value of a consistent shared foundation.

Each of the elements in this cycle will be discussed in the following description. The centre of this cycle of activity is the legislation. It represents the core knowledge. All of these activities focus on the legislation—the representation of the core knowledge of the administrative field.

It should be noted that the proposed integrated approach does not apply to all legislation. Much legislation is machinery: broad, empowering legislation, provisions that set up agencies, provisions that stipulate requirements for annual reports or that set up tribunals. This machinery legislation is seldom controversial once enacted, is not frequently consulted and seldom contains any significant logical structure.

The legislation most suited for use with the present invention is determinative legislation: provisions that stipulate people's and entity's rights, entitlements or obligations. These are the provisions that people are concerned about, provisions that determine transactions or that businesses must comply with.

These determinative provisions frequently form intricate logical webs—central provisions call on whole schemes of definitions, exceptions, qualifications and transitional provisions. These provisions are usually used in relation to a specific entity's or person's situation.

The present invention addresses these webs of determinative provisions—their creation and their administration—and avoids the current necessity, in order to work out how these provisions apply to a particular case, of having knowledge of the breadth and detail of those provisions, and having a developed intellectual model of how the provisions interact.

The following description elaborates on each of the functions illustrated in FIG. 12. It presupposes that an agency has developed a rulebase that models the agency's legislation. It explains, for each function, how the use of a rulebase leads to improvements in that function, and how that use either relies on or contributes to the improvement of other functions. Finally, it provides an example for the function. The examples are italicised.

The description will start at the policy analysis stage, although it can be legitimate to start the discussion at several points in the cycle.

Policy Analysis

A rulebase can be used for service delivery. This is its conventional use. By modelling the agency's legislation fully into a rulebase, it is possible to ensure that staff making primary decisions follow the legislation.

In a service delivery context, the rulebase performs two functions relevant to policy analysis.

First, it collects detailed data about clients, in precisely the terms of the legislation. This is different from conventional data collection techniques, which rely on generic forms, that bear no direct relationship to the legislative requirements and that very seldom comprehensively collect the information required by the legislation.

There are constraints on the volume of data that agencies can currently collect about clients. The paper-based forms must be reasonably generic to be remotely manageable. The data collected must be geared to the scope of the agency's existing client database, or there is little point in collecting it. So, agencies collect an amount of client data suited to these media, and rely on their staff to fill in the gaps.

The data collected by a rulebase is both complete in terms of the items required by the legislation for a determination in that case, and framed in the terms of the legislative requirements. We term this primary data.

Secondly, the rulebase infers very precise conclusion about which sub-paragraphs, paragraphs, subsections and sections of the legislation apply to a particular client, and can store that information. This secondary data provides a complete picture of how the legislation applied (positively or negatively) to each client.

If this primary and secondary data is stored, the policy analysis capabilities of the agency are profoundly increased from the current norm. The agency will have a great deal more primary data, giving them more precise profiles of the characteristics of their client population. The agency will also have a rich mine of secondary data, identifying which provisions of the legislation are used by which clients in which circumstances.

If this data is stored and properly examined, it becomes possible to measure the exact impact of existing or new policy. It is possible to know precisely which clients have benefited from or been affected by new legislative provisions. This doesn't require any assumptions or extrapolation—the data is comprehensive.

This capacity to store and analyse legislative data relies on a rulebase being used for the delivery of services, and provides a powerful research base for policy development.

EXAMPLE

A tax agency administering tax credits may process the claims for those credits.

A legislative rulebase is used to determine those claims, applying the legislative requirements to each case. This means that, for every case, the agency can identify which provisions have been relied on. The Minister receives a question, asking how many people have been affected by recent legislative changes. At present, the agency might have to analyze a limited set of data, interpret from that data the likely impact of the changes, make allowances for low take-up or non-compliance and provide a cautious approximation of the impact.

In the future, the agency should be able not only to answer the question immediately, but also to provide lower level information on the impact of particular portions of the new policy, and the demographic profile of people affected by the new legislation. This information should be comprehensive and authoritative.

Development of Targeted Policy Options

With the policy analysis capability outlined above, it is possible to provide better advice on the impact of policy, and on potential policy options. It allows the impact of those options to be very accurately tested. This ability to test options is explained further in the next section of this paper.

However, the use of a rulebase by staff delivering services to clients (or by clients themselves) does open a critical opportunity for policy developers to target policy far more precisely than has previously been possible.

When a person uses a rulebase in an operational environment, the system will guide them through an intelligent data collection process. It continually makes decisions, drawing inferences about how the legislation will or will not apply in this person's case, and fashioning the data collection to suit the situation of the client.

This means that a rulebase provides a very efficient, intelligent way of traversing a vast body of legislation, and determining its impact. For example, the application of over 800 pages of Australian social security legislation will often require only about 60 items of data to be collected.

The rulebase absorbs and hides the complexity of the legislation from the user. The user has an experience of relative simplicity. This means that the complexity of the underlying legislation or policy is not daunting for either the client or the staff member using the system.

This creates an opportunity for policy makers. It is possible to develop increasingly complex, refined policy, targeting specific categories of clients more precisely than before. High risk categories, high cost cases, those with high sensitivity or low risk, high volume cases: all these can be handled according to specially fashioned rules. Instead of a single, inconsistently-exercised discretion requiring senior staff attention, more junior staff can apply very precise rules for different situations.

This capacity to increase the targeting and sensitivity of policy also provides the opportunity for richer data collection. This in turn feeds the policy analysis function, so that the agency can address the needs or issues of specific client categories with increasing precision.

EXAMPLE

It becomes clear to a tax agency that a broadly targeted set of provisions has led to exploitation within ten identified industry sectors. Specific legislation would be required to address this problem.

However, the Minister is currently receiving unwelcome criticism about the growing complexity of the tax legislation and the inconsistent advice from the tax agency's staff that results from this complexity.

Specific legislation, covering the situation and problems of each of the ten industry sectors can be enacted These can be accompanied by the provision of intelligent rulebase applications to the agency's staff, with on-line versions available to the industry sectors. These intelligent applications stream users quickly to the correct legislative module, and then walk the user through an investigation of that module, prompting them to answer the questions relevant to the industry-specific legislative issues. The system automatically determines the correct application of the legislation in the specific case.

In this way, the agency's revenue-protection responsibilities are met while it can simultaneously claim to be improving the consistency of advice and to be providing clients with tools that remove the problems of complexity.

Testing, Refinement and Decisions on Policy Options

If an agency's legislation is modelled in a rulebase, it is possible to quickly create and test models of proposed policy initiatives.

Thus a rulebase model of social security legislation for example, is able to change numeric parameters (ages, dates, threshold income or assets levels, payment rates etc) quickly. It is also possible to change the rules governing eligibility for and rates of payments, in either simple or profound ways. Whole new sets of provisions can be formulated and tested.

A weighted, representative sample of cases can be run against a policy model, the outcomes in each case seen, and any differences between that model or any other model (including the baseline of current policy) identified.

This has a number of effects.

First, it is possible to test whether a proposed legislative change will have the legislative impact that is sought.

Secondly, it is possible to see whether it has any unintended consequences, in terms of affecting other parts of the legislation adversely.

Thirdly, it is possible to link the output of this policy-modelling system to demographic and financial models, to identify the fiscal impact of a change very precisely.

Finally, if the agency uses a rulebase in service delivery, and has the policy analysis capability identified earlier, it is possible to test a proposed legislative change against the current client population, and measure the impact on them.

This approach has particular value in catching unintended consequences. Policy makers who are expert in and focused on a particular program, may not see some subtle interactions between that program and another. Or, because of their focus, they may simply forget about an interaction. Complex legislation frequently does have such interactions. The capacity to test the legislative implications of a policy change quickly and accurately can eliminate these mistakes.

EXAMPLE

The government wishes to change the way in which small capital gains are taxed for certain types of business. The government is firm in its position that the legislative changes must lead to precisely the result that it blithely promised during the election campaign.

Achieving this outcome for the different types of business requires quite intricate changes to the tax legislation, as several of these industry sectors are already subject to exceptional treatment.

The tax agency staff responsible for these changes do not have expertise across all of these industry sectors.

If the agency's legislation is modeled in a rulebase, these staff can propose changes to the legislation, model these changes in the rulebase, and test the effect of the changes against either an existing test database or one created for the purpose. Specialists in each of the industry sectors can simply specify which outcomes should be changed and which unchanged if the government's wishes are to be met.

The staff can run the new model of the legislation against the test database, and identify all unforeseen or undesirable consequences of their changes. In this way, they can identify either how they must draft their legislation, or consequential amendments that will be necessary in other parts of the legislation in order to achieve the desired effect.

This reduces the reliance on the industry specialists, and may therefore reduce the time taken to introduce the new measures, as well as avoiding unforeseen consequences.

Public Consultation

The use of rulebase technology to represent legislation makes it easy for people to use the legislation.

A rulebase application, representing proposed legislative changes, can be made available to people likely to be interested in or affected by those changes: industry lobby groups, peak industry bodies, social policy groups, commentators and client advocates.

This means that these groups can quickly and reliably test the way in which the proposed legislation will affect their constituency, and comment on those effects.

This enhances the capacity of government agencies to consult effectively with the community on proposed policy changes, and to provide preliminary education on the changes.

Legislative Drafting

The business of most government agencies is determined by legislation, yet they frequently have no control over the final content of legislation, which is ultimately the province of Parliament.

Legislation is usually drafted by Parliamentary counsel, and then amended directly by the Parliament. The resulting legislation is often significantly different from the initial policy, which the agency will have substantially shaped, and the original Bill, which will have been developed by counsel working with agency policy-makers.

There are several improvements that can be secured by aligning legislative drafting with the development and use of a rulebase:

the communication of policy requirements to a legislative draftsman will be enhanced if they share a logical model of the existing legislation and the desired effect of the new policy;

the time taken to draft amendments to legislation could be reduced;

the time to implement new legislation can be radically reduced, if the legislation is drafted in a way that facilitates the rapid creation or updating of a rulebase.

Drafting style involves two elements. One is the selection of words to precisely and accurately communicate ideas. The second is the selection of a framework in which the logical interactions between requirements will be represented.

The first, the precise use of language, is not relevant here. The second is completely relevant.

The logic of a set of policy requirements can be represented in a range of different ways, in accordance with the style of a particular drafter. Many different logical structures, and the use of many different words to express logical connections, can be used while still accurately representing the logical effect of the policy.

However, there are some structures and techniques that make it very easy to build a rulebase from the legislation (and even to substantially automate that construction), while others make it relatively difficult. The consistent use of logical operators is particularly helpful when converting legislation to a rulebase.

A rulebase uses a very rigorous set of conventions for the representation of logic. Parliamentary drafters tend to use quite individual styles and conventions. There are many ways of representing "no"t accurately with no difference in effect, and many ways of representing "or", again with no difference in effect.

The alignment of drafting conventions for the representation of logic in a consistent way with those used by a rulebase, has an immediate impact on the speed and ease of rulebase construction. Whilst it is possible to create a rulebase from legislation, consistent logical frameworks makes it easy.

If a drafter complies with an agreed set of conventions for logical structures, it becomes possible to create a rulebase extremely quickly and very reliably from the subject legislation. This substantially automates the construction of the rulebase with the creation of rulebases being an almost immediate by-product of legislative drafting.

A number of what can be termed "drafting principles" exist which, if consistently adhered to, would align the logical model of a piece of legislation very closely with a rulebase model. Whilst each of the principles may represent good practice, the cumulative effect of their rigorous and consistent use significantly enhances the legislative process.

If the drafting stage is conducted with the needs of the other functions directly in mind, in a manner not only consistent with the policy medium that they share, but also directly creating that medium, there is scope for significant improvement.

EXAMPLE

A new tax initiative requires a new Part to be added to the tax legislation. This is drafted in accordance with the conventions. Validation software parses the draft to check on conformance with the conventions. This validation software also identifies duplicate provisions, incorrect cross-references and similar drafting errors.

This legislation is scanned, and its translation into a rulebase is largely automated Any requirement for manual modeling is identified and quickly carried out. Within days of the legislation having been drafted, a legislative rulebase has been created This dramatically reduces the time, effort and cost required to make all of the subsequent stages possible. It therefore increases the likelihood that they will take place.

Testing and Correction of Legislation

Testing Legislative Quality

The rigorous process of creating a rulebase from legislation inevitably identifies drafting errors (incorrect cross-references, absurd and unintended consequences) as well as ambiguities that require clarification. Automated validation checks find a range of other errors (loops, unused provisions, logical holes).

So, while developing a rulebase an agency is likely to immediately identify problems or areas for improvement in their current legislation.

It is also possible to automatically identify where all provisions are used, and the provisions that will be affected by any change. Because the rulebase holds a dynamic model of the legislation, with all logical connections encapsulated within it, it is possible to automatically identify any of these connections, no matter how remote or convoluted they might be.

The alignment of rulebase creation with legislative drafting can provide an agency with an efficient and effective means of ensuring the drafting quality of the legislation. Otherwise, these errors are found too late.

Testing Policy Outcomes

Once the legislation has been modelled into a rulebase, it is possible to run the same sorts of tests as were suggested in the policy testing phase. The new legislation can be run against large case samples, to check that it has had the intended policy effect, and has not had unintended consequences. The agency can test the quality of the legislation in terms of its achievement of policy outcomes.

Why Test Legislation?

In these ways, the quality of legislation that is proposed to Parliament can be more assured.

This has particular relevance to legislation that is likely to have significant revenue consequences. The agency, the drafter and the Parliament all know that efforts will be made to find loopholes, unintended consequences and ambiguities.

For many agencies, the quality of its legislation has a very direct impact on revenue collection or expenditure. While rulebases offer a means to reduce administrative savings (discussed under a later heading) it is often the savings in program expenditure or in revenue collection that will be most important.

Agencies therefore have an interest in assuring the quality their legislation as far as possible, to protect revenue and to ensure that the Government's policy is correctly implemented. New methods of improving this quality are valuable, particularly if those methods also lead to substantial improvements in other agency functions.

EXAMPLE

Following from the last example, a rulebase has been created, based on some new tax legislation.

As soon as this is created, automatic processes are run to find any loops, any provisions that can't be used (because of the interaction of exceptions), any duplicate definitions, and similar errors.

The legislative rulebase is then run against the same database of test cases used during the policy development phase. The final results of the policy development phase have been saved, so the desired set of outcomes is known.

The legislative rulebase produces different results for a small number of client profiles. This might indicate either a problem with the policy, or a drafting error. It may indicate an anomalous effect for some members of the community that hadn't been contemplated But it can be addressed by discussion between the Minister, the agency and Parliamentary counsel, so that the outcomes of the Bill for the full range of client groups will be known and consistent with the government's wishes.

Enactment of Legislation

It is possible that Parliament may one day enact some legislation (important pieces of determinative legislation) in a form other than paper—in a dynamic format that unambiguously captures the intended logical effect of the provisions. Alternatively, Parliament may sanction such a dynamic form in addition to enacting a paper version.

By doing this, Parliament could avoid some of the later (and costly) arguments about the intent of the legislation, by removing the capacity for ambiguity about the intended logical interaction between provisions. The intended impact of the legislation on a broad range of client groups could be tested and verified.

This is an extension of modern drafting practices that include tables, method statements, examples and procedural instructions with a format that implements these drafting devices, which are practical and sensible departures from the traditional slavish use of convoluted sentences to explain logical interactions.

This type of step would only sensibly apply to determinative legislation: provisions that specify detailed requirements for a right, entitlement or obligation.

EXAMPLE

As part of the passage of tax legislation through Parliament, it must be scrutinized in detail by a committee. Several members of this committee request information about the impact of certain changes which they believe would be beneficial.

The agency models the requested changes, and identifies the impact that they will have on the range of clients contemplated by the committee members, but also the impact on other client groups.

Through a process of requests, modeling, testing and refinement, the draft legislation is altered before it is presented to Parliament.

The legislation, once enacted, includes a provision that the outcomes determined by an identified rulebase correctly illustrate the intended logical effect of the provisions for all clients whose circumstances are covered by the accompanying suite of test cases.

Testing the Effect of Legislation

A further testing step is possible after legislation has been passed. The impact of the final legislation will often be different from that contemplated at either the initial policy development stage, or the drafting stage. Parliament will have made amendments, some drafted at the eleventh hour.

An agency responsible for the implementation of legislation can use a rulebase to determine the actual effect that the final Act it will have on the client population. Once again, running the legislative rulebase against a large sample of cases will identify any unforeseen consequences. It may be too late to change the legislation if those consequences were not intended by the legislature, but at least the executive agency will be prepared.

EXAMPLE

Parliament sits overnight, debating the controversial provisions of some proposed changes to tax legislation. Deals are done, compromises made, and amendments hastily drafted and agreed.

The final Act that passes the Parliament is materially different in several respects from the Bill that had been tested and put to Parliament.

The tax agency quickly changes their rulebase model to reflect the legislation as it was ultimately passed They run this against their test case database. This highlights that the Parliamentary changes will lead to unexpected windfalls for certain high-income families.

The agency notifies the Minister of this, so that he/she can take action—before it becomes front page news.

Translation of Legislation to Operational Policy

In many agencies, the front line staff charged with making primary decisions do not use the legislation directly. Instead, the agency drafts operational guidelines or instructions that explain and elaborate on the legislation, often mixing this with an explanation of the procedures that must be followed when implementing the legislation. This translation is sometimes done by policy staff, but it is often people responsible for managing the service delivery area that prepare these guidelines.

The use of a rulebase substantially removes the requirement for this stage. The rulebase captures and implements the effect of the legislation, and it is directly useable by staff. It will usually need to be supplemented by explanatory material, describing how to exercise judgement on specific legislative issues. But the scope, logic and effect of the legislative requirements does not need to be translated.

This means that there is a very direct integration between the policy area and the staff delivering services. The policy staff are likely to be the people who create the rulebase and any associated elaborative policy.

This provides policy areas with greater control over the manner in which the legislation is administered and the quality of that administration. It enhances their function, requiring them to combine their knowledge of legislation and policy with practical considerations of implementation.

This addresses one of the common tensions within this type of government agency: a perception that policymakers are removed in ivory towers, lacking contact with or concern for front line staff. The use of rulebase technology provides an opportunity (and even a requirement) for policy staff to play a role in the design of service delivery methods, because they design the rulebase that controls primary decision-making.

This also means that what is applied by service delivery staff, clients or advisors is the legislation itself. It is not a paraphrasing of the legislation, a common subset of rules, the confused memory of a staff member or a jumble of office folklore. It is the precise detail of the legislation.

It is possible to administer a large and complex body of delegated legislation, dealing with entitlement for example, where the policy will change frequently if under constant review by specialists. The staff need not be trained in these changes and explanatory bulletins, instructions or manuals are not required.

Instead, the rulebase-driven system used by the staff implements the policy changes in a timely and consistent manner irrespective of geographic location. The staff simply address the issues as prompted by the system. They apply precisely the requirements specified in the delegated legislation. They concentrate on exercising their judgement, and considering evidence, using supporting tools provided by the system.

Removing or reducing this translation step is not only more efficient, it is more correct. It means that clients' rights, entitlements or obligations are being determined according to the law.

EXAMPLE

The Government introduces a wide-ranging set of changes to the tax system. This renders a lot of current staff knowledge redundant (and, in fact, dangerous), and requires the application of a set of entirely new rules.

Instead of embarking on a large-scale training and quality control exercise—a nightmare for both management and staff—the agency implements the new legislation through a rulebase system. This will ensure that staff are consistently guided through the right issues for any case, and will automatically determine the logical result of their judgment on these issues.

The agency takes the opportunity to change its business processes. Instead of simply training staff in the use of this system within their old silo structure, they integrate the work of the old division with that of another division that already uses rulebase technology. The tools are the same, and staff are now capable of operating across both programs.

This breakdown of old structures services the agency's clients better, breaks down some entrenched dynamics within the agency, and provides the opportunity to meet the agency's efficiency targets.

Data Collection and System Data Requirements

Replacing Form Design with Intelligent Data Collection Processes

It is essential to collect data in order to administer legislation. Whether the agency collects the data and makes determinations, or whether businesses operating under a regulatory regime gather their own data, it is necessary to frame a set of data requirements in terms of the information required to properly apply the legislation.

Traditionally, this has been done in a generic way prescribed by the available media: paper forms. Forms can usually only collect a subset of common data. To collect all of the information genuinely required to apply legislation correctly in all cases would require forms of unwieldy size and complexity.

A rulebase provides an intelligent data collection process: only data that is essential is collected, and the required data is dynamically determined as the peculiar characteristics of each case unfold.

The first benefit of this is that it is possible to eliminate paper forms for many or all clients.

In addition, it is possible to collect more and better data. The intelligent navigational process means that it is possible to collect more detailed information from each client: precisely the detail of the data required by the legislation for that person's case, rather than a fixed, generic set of data.

Automatic Identification of System Data Requirements

A rulebase can automatically identify the base data required to satisfy any single legislative goal. It is possible to instantly identify the full scope of data requirements for any transaction, and to filter these to exclude branches of the legislation that will be handled in special ways.

This provides several benefits:

It is possible to quickly identify similar data elements from a complete list, and therefore to identify where rationalisation is possible and sensible. By synchronising the language of different legislation provisions, it can be possible to eliminate collection of similar data items: the data analysis can inform sensible amendments to simplify the legislation and make it consistent.

As long as paper forms remain practically necessary, it is possible to quickly and reliable identify the data that will be required to satisfy the legislation. This can help in form design, even if it is not practically possible to collect all data items. This can also help in the design of a transition from paper-based forms to intelligent online data collection processes.

The legislation ultimately specifies the data requirements that an agency's information storage systems must accommodate. This automatic feature allows an agency to quickly assess the impact of legislative change on its existing IT systems, and the data requirements for new systems.

EXAMPLE

The Government wishes to introduce a new tax credit for students. This will require new administrative and IT systems.

Because the tax agency models its legislation in a rulebase, it can immediately identify the data requirements for both the collection of information from clients and the storage of information for payment and analysis purposes.

The agency takes a bold step. There will be no paper forms. All data collection will be online. For students who don't have access to the Internet at home, the tax agency will provide facilities at tertiary institutions.

This means that the agency can achieve 100% data entry by the students. There is no such thing as an incomplete form: the system requires students to provide the necessary information, with substantial explanatory assistance for each data item.

It also means that all assessments can be automated and instantaneous. Because of their data matching capability, the tax agency doesn't require production of evidence in all cases, but can manage the risk of fraud adequately through targeted audit.

The new scheme is implemented in an unprecedentedly short time, with very low administrative costs from the outset. Students know their entitlements without delay, and the management information system that has been created to analyze the client data is unusually rich, allowing high quality analysis and evaluation of the new credit's impact.

Design of Service Delivery Structures and Systems

The existence of a rulebase has enormous implications for the design of service delivery structures, methods and support. It provides a means by which an agency can genuinely re-engineer its processes, and can enhance its methods of delivering services.

The use of a rulebase removes the need for staff to have specialised knowledge of the core knowledge—the legislation and policy. They will often require a broad understanding of that policy, and an understanding of the business of the organisation. But, using an application developed from a rulebase, more generally skilled staff will have the capability of operating effectively across a far broader range of subject areas: across different pieces of legislation, different programs and even different portfolios.

This is a critical step in enabling processes to be designed around client's needs. In order to be a client-focused agency, it is essential to equip staff to be genuinely competent across a range of service areas. Staff specialisation seldom services clients well.

Because the use of this technique enables radically different service delivery methods (such as single-point processing, self-service, contracted services and one-stop shops), new delivery processes should be developed for the support of these options.

EXAMPLE

The new student tax credit has been implemented from the outset as an electronic service (as in the previous example).

Instead of creating a new claim processing section, as for the other tax credits, the agency creates a small, specialized team. The first role of this team is to develop and maintain the rulebase application that the students will use. The second role is to design and conduct a targeted audit program, to ensure compliance. The third role is to monitor the implementation of the scheme, and the output of the management information system, to suggest policy and application improvements.

The new scheme is implemented at 20% of the administrative costs per claim of other tax credit schemes, because the students do virtually all of the processing work.

Staff Training

The existence of a dynamic model of the agency's core knowledge makes an immediate and substantial contribution towards meeting staff knowledge requirements.

The use of rulebase technology removes the need for staff to learn and retain the detail of new legislation or policy. The rulebase system prompts them to address individual issues, requiring them to exercise general skills in judgement, discretion and consideration of evidence. They no longer have the pressure of memorising the minutiae of legislation or policy.

This means that training can focus more on the development of general skills required for client contact, and less on technical knowledge. This also means that the profile of recruits and the skills sought from new recruits can change to suit more client-focused administrative arrangements.

EXAMPLE

The tax agency implements new tax credit legislation. Rather than creating a new branch to administer this new credit, it simply extends the rulebase processing system used by staff who administer another tax credit.

The staff do not require detailed training in the new tax legislation, because they don't need to have a detailed knowledge of it. They are familiar with the rulebase technology, and the guided approach to administering legislation.

They are trained in half-day sessions to use the new rulebase modules, which integrate with their existing case management system. The processes are the same, it is just the content of the rulebase investigations that is different.

Staff throughout the country are quickly able to take on the additional program, without any specialized knowledge of it.

Public Education

Most Government agencies have an interest in educating their client communities about changes to legislation or new policy initiatives. Effective public education leads to greater acceptance of change, higher compliance and ultimately lower administrative costs. Public education is also a specific responsibility of most agencies.

The use of rulebase technology provides these agencies with the capacity to give their client communities a new and very effective means of public education. It is possible to create intelligent, targeted tools that help clients to quickly and accurately assess the impact of proposed or recent policy changes to their situation. These facilities can be made available to both staff and clients online.

These intelligent tools are usually more useful to clients than any number of pamphlets, booklets, paper kits or television campaigns. This is because they can quickly answer the clients' precise questions, rather than simply providing generic information.

A secondary problem in conventional public education is the provision of inconsistent advice by agency staff. At times of new policy initiatives, large numbers of clients will want answers to specific questions. They will ring agency staff or those on hotlines set up to cope with this peak demand period.

Rulebase tools help these staff to deal with quite complex issues accurately and consistently.

Rulebases created from the legislation can be used to answer very precise questions. While a rulebase can model a large volume of legislation, it is not necessary to investigate all of the legislation. Multiple entry points can easily be created to query any discrete part of the legislation, or to answer predictable, high-volume questions.

The introduction of new programs, and particularly complex programs, requires effective public education. The success of the initiative will often depend upon public acceptance. The provision of effective tools that clients can access directly provides a targeted, effective and relatively cheap way of addressing the public's needs.

If an agency holds its core legislation in this format, providing these intelligent tools during the public education phase is relatively straightforward. It can become a standard by-product of the creation of the legislation.

EXAMPLE

The government passes new capital gains tax legislation. This affects large numbers of businesses and citizens. It has a high political and press profile.

The tax agency has developed rulebases to model the new policy at each stage of the passage from final government policy to legislation. At each stage, it has made these publicly available, providing explanatory textual support for each requirement to help the public to understand the requirements.

The public have been able to access these rulebase tools directly over the Internet, through call centers, in mobile booths set up during public education seminars, and at the tax agency's offices.

People are invited to assess how the new policy will apply to them. They are able to run and print the results from different scenarios, testing how changes in their circumstances will affect them.

If members of the public believe that they are affected unfairly or in an anomalous way, there is a mechanism for them to identify this to the tax agency. In this way, genuine anomalies and likely political problems can be picked up and corrected.

Alternatively, the tax agency may prefer to wait until the new policy is law before making these tools available to the public. The period around commencement of the new regime will be the most hectic, with agency staff being called on to advise on a host of situations.

By developing these intelligent tools, as an adjunct to the legislative drafting process, the agency is well-placed to provide detailed, consistent, accurate advice to clients in an efficient way from the commencement of the scheme.

Delivery of Services

The use of rulebase technology dramatically improves the accuracy and consistency of primary decision-making. It can reduce the following sources of error:

staff relying on their original training, and their memory of the content of that training;

staff relying on their faulty memory of more recent legislative or policy updates, bulletins or instructions;

staff relying on their knowledge of a common subset of the legislation;

staff relying on an office expert, whose own knowledge is flawed;

staff having insufficient time to properly research unusual situations or complex questions;

staff failing to consult interpretative material, because of the pressure of work;

staff continuing to enforce repealed legislation or superseded policy;

staff misinterpreting the logic of intricate legislative requirements;

staff in different offices developing differing standard interpretations of intricate or ambiguous legislative requirements;

staff failing to keep up-to-date with changes in the legislation or policy;

staff failing to remember or implement guidelines on the exercise of discretion or evidentiary requirements.

A rulebase forces a decision-maker to consider all relevant issues in any case, and only those issues that are relevant, and then it automatically infers the correct conclusion, implementing the logic of the legislation. It does this consistently throughout a large, dispersed staff base. And if the rulebase is up-to-date, then all staff will be administering current policy.

The staff must still address each relevant issue, and exercise judgement where required. But by automatically navigating broad, intricate legislation, and reliably executing the logic of that legislation, a rulebase addresses the causes of the majority of errors.

Accuracy is not only important because of accountability and equity considerations. It also has a very direct impact on program expenditure or revenue collection. Correct primary decision-making is a prerequisite for proper control of a program budget.

As previously noted, rulebase technology largely removes the need for specialist knowledge, which in turn opens up new options for the delivery of services. Self-service becomes a credible option in otherwise impossible transactions. One-stop shops, external service delivery agents and single-officer processing all become viable in more than cosmetic ways. In each case, it is possible for a transaction to be completed, even though it may require a decision on the application of very complex legislation.

While the use of a rulebase in the other functions will improve the quality of overall administration, this is probably the major source of cost savings, particularly savings of administrative costs.

Example 1

A tax agency employs thousands of staff to apply tax legislation, when advising clients and when determining tax liability.

The agency has been receiving very bad press because of an audit of the consistency and correctness of its decisions in one program area. That audit has identified that clients in the same circumstances are likely to get different answers from different offices, that there is an initially surprising correlation between staff experience and error levels, that most staff do not look at legislation but instead rely on the advice of colleagues, and that many staff still administer repealed legislation two years later.

The agency has modeled its legislation into a rulebase. It makes it compulsory for staff to use the rulebase when answering questions about how legislation applies to a client's circumstances. It links the rulebase to the tax return processing system, so that staff must use it to determine liability.

Error rates immediately go down, and identical cases are demonstrably handled consistently from office to office. Staff no longer rely on office folklore or the advice of colleagues to deal with difficult issues, but rely on the system. Audit of the quality of decisions is easy and reliable.

Example 2

A tax agency previously employed advisors to provide rulings on the complex interaction of tax provisions. These advisors dealt with specific requests for interpretation of the law, researching the provisions that affect the client, and preparing an official response on the way in which the provisions interact. If a particular case raised new questions, they consulted with senior policy or legal staff on the correct or desirable interpretation.

This process has been expedited since the creation of the rulebase model of the agency's legislation.

The interaction between all provisions is now known. During the development of the rulebase, decisions were made by senior policy staff to resolve difficult or ambiguous logical interactions.

The advisors now work in a two-step process. Initially, they simply consult the rulebase application, feeding the client's situation into the model and identifying the conclusion. The system automatically generates a letter to the client, advising on the outcome of the investigation. The letter also states that if the client is not satisfied with this, they can request a second reconsideration. This reconsideration by senior policy staff, if it led to a different conclusion, would require a re-examination of the previous resolution on the issue that the rulebase had implemented.

As a next step, the agency makes the rulebase application available to clients. It commits that, if the client holds output of this system, with a full audit trail of the decision and a signed declaration as to the accuracy of the inputs, this will have the status of official advice from the tax agency. Within two years, the number of rulings has quadrupled, while the number of rulings handled by staff has halved.

Design of Impact Measures

Before implementing new legislation, it is sensible for an agency to identify the ways in which it wishes to measure its impact.

Where legislation is administered using a rulebase, the impact of the new legislation can be very precisely measured. The rulebase collects detailed primary data, framed comprehensively in the terms of the legislation. There is a direct correlation between each item of data and the relevant provisions of the legislation. In addition, the rulebase infers secondary data: which provisions of the legislation have been satisfied by each client, and how.

It makes sense for an agency to be more ambitious in designing their measurement of policy impact, when a rulebase is used. In pilots, in samples and in full production systems, it is possible to extract comprehensive information about the take-up of the new measures, the profile of clients affected and any negative impacts.

EXAMPLE

A tax agency implements a new method for assessing tax on super-annuation. This requires all people claiming a concession to determine their entitlement to the concession and assess the level of concession through an online facility.

The online facility includes a rulebase model of the legislation. Before the introduction of the scheme, the agency designs the way in which it will measure the impact of the new concession.

It decides that it will save all the primary data elements that determine entitlement and level of concession. From this data, it can automatically recreate all assessments and query all legislative conclusions. After 6 and 12 months, it will report on precisely which categories of client have taken up the concession, the level of reliance on different grounds for entitlement, the number of clients at each concession level, and the major categories of people who tested their entitlement but were disqualified All of this can be automated.

Measurement of Policy Impact

The last step in this process is to measure the impact of policy, whether current or new. This has been explained in previous sections: the rulebase provides a capability to measure the impact in far more detail and more comprehensively than ever before.

This in turn feeds into better policy analysis, better policy development and therefore better legislation.

EXAMPLE

The tax agency has implemented its student tax credit and its capital gains tax concession using rulebase technology.

All of the data from these is saved into a management information database. The agency has developed a standard set of reports that will be generated from this database: profile of successful claimants, profile of unsuccessful claimants, an analysis of the different grounds of entitlement, measurement of actual impact against predicted impact. These reports are easily generated, because the data reflects the legislative provisions and criteria.

This also enables the demographic weightings applied to each profile in the test case database to be tuned, so that the likely fiscal impact of policy options can be more precisely forecast.

This information is provided to the policy analysts, who determine whether any tuning of the legislation or administration is required.

Examples of a set of rules for providing a framework or templates for the development of a rule base suitable for legislation are included below. However it is to be understood that these are exemplary of suitable rules and are not exhaustive of the rules which can be used in accordance with the present invention. In the following discussion it should be noted that a "legislative unit" is a discrete part of a legislative document indicated by a letter or number or combination thereof. Thus "Subparagraph 48(1)(a)(ii)" is a legislative unit, as is "Item 24A".

Before describing and explaining a number of rules in detail, some logical clarity issues will be discussed in detail. With a very few exceptions, every legislative statement should be reducible to if then logic and the Boolean operators and, or and not.

Consider the following example:
A is true if
B
and C
or
not C
and D
and not E
Otherwise A is false.
The payment is a qualifying payment if
It satisfies the qualifying payment rules in schedule A
and it exceeds the qualifying payment threshold
or
It does not exceed the qualifying payment threshold
and it is listed in the special qualifying payments list in schedule F
and it is not disqualified by the operation of section 277.
otherwise the payment is not a qualifying payment In order to apply the law, a lawyer or a member of the public must first go through the process of reducing the law in question to these elements. Only then can he or she examine the facts of the case to work out what the answer to the main question is.

In the "qualifying payment" example above, in the absence of a legislative statement explicitly setting out each and every way a payment can be a qualifying payment, the person using the qualifying payment legislation would have had to read all the provisions about qualifying payments very carefully in order to come up with the above logical road map.

Legislation which is logically clear should provide its own logical road maps.

The section below discusses these ideas in further detail.

1. Logically Clear Legislation Should Put the Goal at the Start, Followed by If/Then Premises.

The goal is the question for which an answer is sought. While an infinite number of questions can be asked of a piece of legislation, each piece of legislation is capable of providing answers to a only a limited number of questions. These will be apparent from the subject matter of the legislation.

Consider the following example (from a fictitious piece of taxation legislation). The goal is: "is the payment a qualifying payment?":

Section 23.

23. Where a payment exceeding the qualifying payment threshold satisfies the qualifying payment rules in schedule A, it shall be a qualifying payment for the purposes of this Act.

. . .

Section 276.

276. Provided it is not disqualified by the operation of section 277, a payment not exceeding the qualifying payment threshold and which is listed in the special qualifying payments list in schedule F shall be a qualifying payment for the purposes of this Act.

Section 277.

277. The following payments are disqualified from being qualifying payments: . . .

In order to obtain a complete statement of the circumstances in which a payment is a qualifying payment, the reader of the above legislation would have to read as least as far as section 277, and probably all the way to the end (just to ensure there were no further qualifying payment provisions).

The following is an example of logically clear legislation abiding by this principle:

SOCIAL SECURITY ACT 1991

Section 43 Qualification for Age Pension

43(1) A person is qualified for an age pension if the person has reached pension age and any of the following applies:

(a) the person has 10 years qualifying Australian residence;

(b) the person has a qualifying residence exemption for an age pension;

(c) the person was receiving a widow B pension, a widow allowance, a mature age allowance or a partner allowance, immediately before reaching that age;

(d) if the person reached pension age before 20 Mar. 1997—the person was receiving a widow B pension, a widow allowance or a partner allowance, immediately before 20 Mar. 1997.

2. Logically Clear Legislation Should Have Only One Goal per Unit/Rule

Recalling that a goal in this context is the question for which an answer is sought, the logical structure of the legislation is obviously much clearer if different questions, or goals, are separated from each other. However, if two goals are proved (two questions answered) by the same set of circumstances, there can be a temptation to save space by dealing with them together.

Consider the following example:
Section 17.
17. Where:
a person has left the United Kingdom; and
the person has left property in the United Kingdom; and
the person has no intention of returning to the United Kingdom;

all property of the person which remains in the United Kingdom will be forfeited to the Crown and any pension paid to the person will be terminated.

The propositions "all property of the person which remains in the United Kingdom will be forfeited to the Crown", and "any pension paid to the person will be terminated" are logically separate. If a person were to approach the legislation wanting to know (for example) all the circumstances in which a person's pension could be terminated, he or she would be likely to miss this provision. Therefore, in Logically Clear legislation, each consequence of a state of affairs should be separated from every other consequence of that state of affairs.

Following is an example of logically clear legislation abiding by this principle:

87-55 Effect of qualifying business determinations (1) An individual conducts a qualifying business during an income year if a*qualifying business determination is in force relating to the individual.

(2) A*qualifying entity conducts a qualifying business during an income year if a*qualifying business determination is in force relating to an individual whose*qualifying income is included in the entity's*ordinary income or*statutory income.

It can be noted that, in less logically clear legislation, the two goals above might have been dealt with together in the following way:—

87-55 Effect of qualifying business determinations

An individual or qualifying entity conducts a qualifying business during an income year if a*qualifying business determination is in force:

relating to the individual; or (in the case on a qualifying entity), relating to an individual whose*qualifying income is included in the entity's*ordinary income or*statutory income.

3. Logically Clear Legislation Should be Composed of Closed Rules

A "closed rule" for these purposes is a complete statement of the requirements which must be satisfied for a particular proposition to be true. If any of the requirements set out in the rule are not satisfied, it should be possible to conclude that the proposition is false.

A "closed rule" can be thought of as a sentence of the form "X is true if and only if Y and Z, or A and B. Otherwise X is false".

Legislation which provides multiple ways for a person to be entitled to something, with no guidance on how those ways relate to each other (no and or operators) introduces great difficulties for the reader. He or she may conclude that if a particular provision is not satisfied then he or she is NOT entitled to the relevant benefit, when in fact a completely different provision elsewhere in the legislation entitles him or her for different reasons.

Consider the following example:

Section 249.

249. (1) A person is eligible for Family Tax Benefit if the person:

is a single person; and has a qualifying child; and lives in the United Kingdom.

. . .

Section 340.

340. A woman is qualified for Family Tax Benefit if she received Parenting Payment at any time before 1 Jul. 1998.

The reader who fails section 249 may never realize that this is not necessarily the end of the matter unless he or she reads on to section 340.

The logical clarity of the above could be improved simply by ensuring that all the ways of qualifying for Family Tax Benefit (or, at least, references to all the ways) are collected together in one place. Thus:

249. A person is eligible for Family Tax Benefit if the person:

(a) is a single person; and has a qualifying child; and lives in the United Kingdom; or satisfies section 340.

. . .

Section 340.

340. A woman is qualified for Family Tax Benefit if she received Parenting Payment at any time before 1 Jul. 1998.

4. Logically Clear Legislation Uses Consistent, Simple Logical Operators (AND, OR, NOT)

Where legislation uses logical operators other than AND, OR, or NOT, the reader desiring to understand the legislation must go to extra effort of reducing any other operators (such as "other than" "subject to", "except", "notwithstanding", "nevertheless") to these simpler terms.

Consider the following example:

Item 57

All articles of clothing are exempt other than shoes, boots and fur hats.

A reader seeking to understand this provision must distil it, in his or her mind, to the following:

The articles of clothing are exempt if

The articles are not shoes; and

The articles are not boots; and

The articles are not fur hats.

Consider another example:

(3) The individual's qualifying income is not taken to be from conducting a qualifying business unless:

(a) when the qualifying income is gained or produced, a*qualifying business determination is in force relating to the individual's qualifying income; and (b) the income is not disqualified by the operation of section 85-15.

The following is an example of logically clear legislation abiding by this principle.

The formulation "not . . . unless" is often meant as the equivalent of "if and only if". If this is the case then such a closed rule can be simplified thus:

(3) The individual's qualifying income is taken to be from conducting a * qualifying business if:

(a) when the qualifying income is gained or produced, a*qualifying business determination is in force relating to the individual's qualifying income; and (b) the income is not disqualified by the operation of section 85-15

5. Logically Clear Legislation Separates Alternative Requirements ("Options") into Separate Legislative Units Consider the following example:

(3) The Commissioner may only make a determination if satisfied that, in the income year during which the determination first has effect, the individual:

. . .

(b) but for unusual circumstances applying to the individual in that year, could reasonably have been expected to meet, or would have met, at least one of the 3*qualifying business tests; and . . .

Paragraph (b) contains two alternatives, indicated by the phrases "could reasonably have been expected to meet" and "would have met". For logical clarity, they could be separated thus:

(3) The Commissioner may only make a determination if satisfied that, in the income year during which the determination first has effect:
. . .
(b) but for unusual circumstances applying to the individual in that year, the individual:
(i) could reasonably have been expected to meet at least one of the 3*qualifying business tests; or
(ii) would have met at least one of the 3*qualifying business tests; and . . .
6. Logically Clear Legislation Calls Units, not Concepts. Consider the following example:
Section 315.
(1) A woman is qualified for a widow pension if she:
(a) is a widow; and
(b) lives in Australia.
. . .
Section 430
A woman is not qualified for a widow pension if she has the custody of a child.
Section 430 "calls" the concept of "qualification for a widow pension" but gives no guidance as to the source of this concept in the legislation. Assuming for the moment that section 315 is the sole source of qualification for a widow pension, the reader of section 430 would be required to know this fact in advance in order to make sense of section 430.
The above example could be improved in logical clarity by amending section 430 as follows:
Section 430
A woman is not qualified for a widow pension under section 315 if she has the custody of a child.
7. Logically Clear Legislation Describes the Method of Applying it Clearly.
Consider the following example:
4-10 (1) The income tax payable for an income year is the taxable income for the income year calculated in accordance with section 4-15 of this Act, multiplied by the applicable rate under the *Income Tax Rates Act* 1986 (subject to any applicable special liability provisions in section 4-25 of this Act), minus any applicable tax offsets under section 13-1 of this Act.
(2) For the purposes of this section, the income year is:
(a) for companies—the previous financial year;
(b) for entities adopting non-financial-year accounting periods in accordance with section 18 of the Income tax Assessment Act 1936—that adopted accounting period;
(c) in all other cases—the financial year.
The above example requires the user to distil the provision to a number of steps and to carry out those steps in order. It would be much simpler if the legislation presented the user with the relevant steps to begin with.
Following is an example of logically clear legislation abiding by this principle:
INCOME TAX ASSESSMENT ACT 1997—SECT 4-10
How to work out how much income tax you must pay
(1) You must pay income tax for each year ending on 30 June, called the financial year.
(2) Your income tax is worked out by reference to your taxable income for the income year. The income year is the same as the*financial year, except in these cases:
(a) for a company, the income year is the previous financial year;
(b) if you adopt an accounting period ending on a day other than 30 June, the income year is the accounting period adopted in place of the financial year or previous financial year, as appropriate.

Note: The Commissioner can allow you to adopt an accounting period ending on a day other than 30 June. See section 18 of the *Income Tax Assessment Act* 1936.
(3) Work out your income tax for the*financial year as follows:

$$\text{Income tax} = (\text{Taxable income} \times \text{Rate}) - \text{Tax offsets}$$

Method Statement
Step 1. Work out your taxable income for the income year. To do this, see section 4-15.
Step 2. Work out your basic income tax liability on your taxable income using:
(a) the income tax rate or rates that apply to you for the income year; and (b) any special provisions that apply to working out that liability.
See the *Income Tax Rates Act* 1986 and section 4-25.
Step 3. Work out your tax offsets for the income year. A tax offset reduces the amount of income tax you have to pay.
For the list of tax offsets, see section 13-1.
Step 4. Subtract your*tax offsets from your basic income tax liability. The result is how much income tax you owe for the*financial year.
. . .
From the above it will be appreciated that in use the present invention provides a rule based computerized method of developing, implementing and administering legislation in which there is developed a computerized database containing a set of declarative rules in accordance with which the legislation can be developed, written and delivered, which computerized database is utilized in accordance with the set of rules to develop the policy for the legislation, and/or to write the legislation, and/or to design the service to administer the legislation, and/or to administer and/or evaluate the legislation; wherein the policy development, writing of legislation, service design, administration and/or evaluation are functionally integrated by the computerized database.
It will also be appreciated that the present invention provides a rule based computerized system for developing, implementing and administering legislation, which system includes a computerized database containing a set of declarative rules in accordance with which the legislation can be developed, written in and delivered, and program means for executing the set of rules to develop the policy for the legislation and/or to write the legislation and/or to administer the legislation and/or to administer the legislation and/or evaluate the legislation; wherein the policy development, writing of legislation, service design, administration and/or evaluation are functionally integrated by the computerized database.
It will also be appreciated that in use the present invention provides a rule based computerized method of writing legislation, in which is developed a computerized database containing a set of declarative rules in accordance with which the legislation can be written, which computerized database is utilized to write the legislation in accordance with the set of rules; wherein the rules are written in a format or representation corresponding to acceptable legislation whereby the legislation is written in a format or representation corresponding to the set of declarative rules.
It will also be appreciated that the present invention provides a rule based computerized system for writing legislation, which system includes a computerized database containing a set of declarative rules in accordance with which the legislation can be written, and program means for executing the set of rules to write the legislation; wherein the rules are written in a format or representation corresponding to acceptable legislation whereby the legislation is written in a format or representation corresponding to the set of declarative rules.

Turning now to those aspects of the invention involving the design of a computer model incorporating the agreed legislative drafting conventions, the following stages outline in broad terms the steps in the implementation of the method and system of that aspect of the invention:

design of a set of agreed drafting conventions for logical structure;

design of a computer model that incorporates those conventions;

enhancements to the drafting editing environment, to assist in use of the conventions when drafting;

creation of a legislative parser that converts the text to a form that can be checked against the computer model of the drafting conventions, verifies that the input conforms to the model and reports any failures to the drafter;

creation of facilities to import the parsed legislation into existing legislative rulebase technology, and to generate a rulebase;

creation of a testing methodology to allow a drafter to specify and test an appropriate range of cases against the legislation.

Each of these proposed stages is explained in more detail as follows.

Drafting Conventions

This requires a marriage of disciplines—legislative drafting and rulebase engineering. It requires parties from each discipline to understand each others' theoretical frameworks, vocabularies and technical and practical constraints.

Drafters are trained to consistently follow some predictable body of conventions without being or feeling constrained or delayed by conformity to the drafting conventions which should not interfere in any significant way with the drafting process.

The conventions, while limited and predictable, are sufficiently rich and flexible to meet the needs of drafters. Ideally, the conventions will be seen by drafters as an aid in drafting, providing helpful levels of discipline and rigor rather than constraining them in their work.

The conventions are to be agreed for a sufficient range of drafting situations. They do not have to cover all possible legislation, nor legislation for all possible agencies. The types of legislation that require adherence to these conventions can be limited to a practical but valuable subset.

Computer Model Encapsulating the Drafting Conventions

The computer model will be the technical implementation of the logical conventions agreed in the previous step. This is a second foundation element of the project. In one preferred embodiment the computer model is an XML schema. The model or schema must be captured, in order to be able to automate the production of rulebases from drafting.

As long as a coherent set of conventions can be agreed, the creation of a computer model such as an XML schema, or any other form of computer model, should have low risk.

Enhancements to the Drafting Environment

This stage is desirable and drafters will benefit from the addition of utilities to their drafting environment that make the conventions easy to comply with.

If these utilities speed up the process of drafting, make it easier, or help by providing appropriate discipline and structure to the drafter's work, then drafters will be more likely to be happy to comply with the conventions.

Legislative Parser

The legislative parser scans the drafted legislation, checking for conformance with the XML schema. It report coherently on any errors or any provisions that do not conform to the schema.

It is likely that there will be provisions that intentionally do not conform to the conventions and schema, because of their unique requirements. These can be flagged by the drafter, and managed sensibly as exceptions.

Creation of a Rulebase

Existing legislative rulebase technology is adapted to accept input from the draft version of the legislation. This means that it is modified to recognize rules framed within the model or schema.

Testing Facilities

A major benefit of this technology to drafters is the provision of an ability to test the legislation they have drafted.

Because a rulebase can be quickly generated from draft legislation, this testing is readily possible. Quick and reliable methods to specify or generate test cases serve the needs of drafters.

This stage may be implemented by creation of dedicated technical tools or by the design of appropriate methods and processes.

It will be appreciated that the present invention has a number of advantages over known rule based systems and methods pertaining to the overall legislative life cycle.

At present, the core knowledge concerning the legislative cycle is typically held in a multitude of versions in two media. The two media are text (whether paper or electronic) and the memories and intellects of staff (or agents) of the agency. There can be multiple versions of the text, which can present problems. There are certainly multiple intellectual models among the agency staff who use this knowledge. Each person who "knows" the legislation will have developed their own model, from the domain specialist in the legal or policy area to the front-line staff-member who directly administers the legislation.

Both these media are flawed. The paper medium is incomplete: it must be complemented by intellectual effort for the effect of the legislation to be coherent. The intellectual models are flawed because they rely for their accuracy on the talent, memory and continuity of staff (or the capacities of clients or agents).

In the present invention this core knowledge is held in a complete, authoritative, dynamic, electronic format, and consequently the functions of the legislative life cycle can be improved. They have a consistent, shared point of reference which is currently lacking. They have a shared, accessible model that they can each rely on and contribute to. Moreover the electronic model is capable of a degree of functionality unavailable with the current media.

The scale of improvement possible in each function exceeds what is currently possible. Moreover the overall improvement, and the capacity for an evolving spiral of improvement, is far greater than the individual improvement, because each function can interact and contribute far more effectively than before.

The present invention provides a universal, dynamic format for representing and using legislation (at least within an agency). The use of programmatic, electronic rulebased media is appropriate for government agencies that increasingly view themselves as electronic businesses, and who recognise that they use IT systems to develop, capture and maintain substantial intellectual property.

The creation of a universal format can create significant benefits. Standards create opportunity. (For example, the acceptance of HTML as a standard enabled the growth of the World Wide Web—a universal protocol for representing information enabled a creative explosion.)

A dynamic, shared model of the core knowledge of an agency enables the agency to implement an integrated approach to improvement with benefits that are significant and demonstrable. The invention provides an integrated approach to quality improvement and it is possible to develop an integrated approach to policy development, legislative drafting and service delivery, in which each directly enhances the quality of the others.

Moreover if policy-makers and those responsible for service delivery make use of the invention, but for example if those responsible for drafting legislation do not, whilst this to some extent will reduce the overall benefit, it will not mean that proceeding down this path is not worthwhile. A holistic approach will however have profound consequences for an agency, by locating a shared view of the core knowledge at the centre of the agency's activities.

Having a common, accessible, dynamic reference point allows the various sections within an agency to communicate more coherently, precisely and efficiently with each other about problems with the legislation driving the agency's activities. Each can become more knowledgeable about, more sympathetic to, and more responsible for the agency's overall administration of its legislation.

Adoption of the holistic approach to legislation of the present invention will increase benefits as the agency's different functions become increasingly tightly integrated, and increasingly refined in their quality.

By creating a shared, enhanced and accessible version of an agency's core knowledge, its legislation, it is possible to adopt an integrated approach leading to overall quality improvement including:

better policy formulation and advice;

better legislation, that gives precise and accurate effect to policy objectives, ideally in a way that is coherent to the staff and constituents of the agency;

a reduced implementation time for new policy or new legislation;

increased accuracy and consistency in the administration of legislation;

an enhanced array of options for delivering the agency's services, whether to improve services to clients or to reduce costs;

a greater focus on clients' needs in their interactions with the agency (rather than on agency processes, structures and convenience) in all of the work of the agency;

a tighter integration of policy and service delivery functions, so as to help to achieve some of these objectives.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A rule based computerized method of developing, implementing and administering legislation, the method including:

developing a computerized database containing a set of declarative rules in accordance with which the legislation can be developed, written in and delivered;

utilizing the computerized database to develop the policy for the legislation in accordance with the set of rules;

utilizing the computerized database to write the legislation in accordance with the set of rules;

utilizing the computerized database to design the service to administer the legislation in accordance with the set of rules, and utilizing the computerized database to administer and/or evaluate the legislation in accordance with the set of rules;

wherein the policy development, writing of legislation, service design, administration and/or evaluation are functionally integrated by the computerized database;

wherein the rules are such as can be expressed in the general format "IF [premise], THEN [conclusion]";

wherein the policy development includes at least one of the following functions: policy analysis, development of policy options, public consultation, testing and refining policy;

wherein the writing of legislation includes at least one of the following functions: drafting legislation, testing and refining draft legislation, enactment of legislation;

wherein the service design includes at least one of the following functions: testing impact of final legislation, translation of legislation into operational policy, data requirements analysis, design of service delivery structures and systems, public education;

wherein the administration includes at least one of the following functions: public education, staff training, delivery of services;

wherein the evaluation includes at least one of the following functions: design of policy impact measurement, measurement of policy impact;

wherein the rules are written in a spoken language, the method further including:

converting the rules when written in the spoken language into a stylised or symbolic format or representation;

wherein the rules are written in a format or representation corresponding to acceptable legislation whereby the legislation is written in a format or representation corresponding to the set of declarative rules; and wherein the format or representation includes:

an alternative conclusion for reflecting the closed nature of legislative rules, and/or a source reference for referencing items in the database to legislative provisions, and/or a configuration syntax whereby the rules are written in the form of the legislative provisions.

2. A rule based computerized method of writing legislation, the method including:

developing a computerized database containing a set of declarative rules in accordance with which the legislation can be written; and utilizing the computerized database to write the legislation in accordance with the set of rule;

wherein the rules are written in a format or representation corresponding to acceptable legislation whereby the legislation is written in a format or representation corresponding to the set of declarative rules;

wherein a plurality of agreed legislative drafting conventions constrain the drafting of legislation in accordance with a logical structure; and wherein the agreed legislative drafting conventions are incorporated in a computer model, the method further including:

providing enhancements to the task of editing when drafting legislation whereby the use of the legislative drafting conventions is facilitated;
creating a legislative parser to convert the text of the legislation to a form that can be checked against the computer model and to report any failures to the drafter of the legislation;
creating facilities to import the parsed legislation into a pre-existing legislative rulebase technology, and to generate a rulebase; and
creating a testing methodology whereby the drafter of the legislation can specify and test an appropriate range of cases against the legislation.

3. A computer program embodied on a machine readable medium that operates a method as claimed in claim 1, for developing, implementing and administering legislation.

4. A computer program embodied on a machine readable medium that operates a method as claimed in claim 2 of writing legislation.

5. A rule based computerized method of writing legislation, the method including:
developing a computerized database containing a set of declarative rules expressed in the general format "IF [premise], THEN [conclusion]" in accordance with which the legislation can be written; and
utilizing the computerized database to write the legislation in accordance with the set of rules;
wherein the rules are written in a spoken language and in a format or representation corresponding to acceptable legislation whereby the legislation is written in a format or representation corresponding to the set of declarative rules, and
wherein the writing of legislation includes at least one of the following functions: drafting legislation, testing and refining draft legislation, enactment of legislation,
the method further including:
converting the rules when written in the spoken language into a stylised or symbolic format or representation; and
wherein the format or representation includes:
an alternative conclusion for reflecting the closed nature of legislative rules, and/or
a source reference for referencing items in the database to legislative provisions, and/or
a configuration syntax whereby the rules are written in the form of the legislative provisions.

6. A computer program embodied on a machine readable medium that operates a method as claimed in claim 5 of writing legislation.

7. A rule based computerized method of writing legislation, wherein a computerized database is developed containing a set of declarative rules in accordance with which the legislation can be written, the rules being written in a spoken language and in a format or representation corresponding to acceptable legislation whereby the legislation is written in a format or representation corresponding to the set of declarative rules, the computerized database being utilised to write the legislation in accordance with the set of rules; the method including:
developing a plurality of agreed legislative drafting conventions which constrain the drafting of legislation in accordance with a logical structure;
designing a computer model incorporating the agreed legislative drafting conventions;
providing enhancements to the task of editing when drafting legislation whereby the use of the legislative drafting conventions is facilitated;
creating a legislative parser to convert the text of the legislation to a form that can be checked against the computer model and to report any failures to the drafter of the legislation;
creating facilities to import the parsed legislation into a pre-existing legislative rulebase technology, and to generate a rulebase; and
creating a testing methodology whereby the drafter of the legislation can specify and test an appropriate range of cases against the legislation.

8. A computer program embodied on a machine readable medium that operates a method as claimed in claim 7 of writing legislation.

9. A rule based computerized system for developing, implementing and administering legislation, the system including:
a computerized database containing a set of declarative rules in accordance with which the legislation can be developed, written and delivered, wherein the rules are written in a spoken language and in a format or representation corresponding to acceptable legislation whereby the legislation is written in a format or representation corresponding to the set of declarative rules; and
program means for executing the set of rules to develop the policy for the legislation and/or to write the legislation and/or to administer the legislation and/or to evaluate the legislation, including means for;
developing a plurality of agreed legislative drafting conventions which constrain the drafting of legislation in accordance with a logical structure;
designing a computer model incorporating the agreed legislative drafting conventions; and
converting the rules when written in the spoken language into a stylised or symbolic format or representation;
wherein the format or representation includes:
an alternative conclusion for reflecting the closed nature of legislative rules, and/or
a source reference for referencing items in the database to legislative provisions, and/or
a configuration syntax whereby the rules are written in the form of the legislative provisions;
wherein the policy development, writing of legislation, service design, administration and/or evaluation are functionally integrated by the computerized database.

10. A computer program embodied on a machine readable medium that provides a system as claimed in claim 9 for developing, implementing and administering legislation.

11. A rule based computerized system for writing legislation, the system including:
a computerized database containing a set of declarative rules in accordance with which the legislation can be written, wherein the rules are written in a spoken language and in a format or representation corresponding to acceptable legislation whereby the legislation is written in a format or representation corresponding to the set of declarative rules and
program means for executing the set of rules to write the legislation, including means for;
developing a plurality of agreed legislative drafting conventions which constrain the drafting of legislation in accordance with a logical structure;
designing a computer model incorporating the agreed legislative drafting conventions; and
converting the rules when written in the spoken language into a stylised or symbolic format or representation;
wherein the format or representation includes:

an alternative conclusion for reflecting the closed nature of legislative rules, and/or a source reference for referencing items in the database to legislative provisions, and/or a configuration syntax whereby the rules are written in the form of the legislative provisions.

12. A rule based computerized system for writing legislation as claimed in claim 11, wherein a plurality of agreed legislative drafting conventions constrain the drafting of legislation in accordance with a logical structure, and wherein the program means utilises a computer model incorporating the agreed legislative drafting conventions.

13. A computer program embodied on a machine readable medium that operates a system as claimed in claim 11, for writing legislation.

* * * * *

UNITED STATES PATENT AND TRADEMARK OFFICE
CERTIFICATE OF CORRECTION

PATENT NO. : 7,287,016 B2 Page 1 of 1
APPLICATION NO. : 10/709131
DATED : October 23, 2007
INVENTOR(S) : Johnson et al.

It is certified that error appears in the above-identified patent and that said Letters Patent is hereby corrected as shown below:

Col 34, line 55         "rule;" should be -- rules --.

Signed and Sealed this

Eighteenth Day of March, 2008

JON W. DUDAS
*Director of the United States Patent and Trademark Office*